United States Patent
Oh et al.

(10) Patent No.: US 12,488,800 B2
(45) Date of Patent: Dec. 2, 2025

(54) DISPLAY APPARATUS AND OPERATING METHOD THEREOF

(71) Applicant: SAMSUNG ELECTRONICS CO., LTD., Suwon-si (KR)

(72) Inventors: Seokjae Oh, Suwon-si (KR); Yeseul Park, Suwon-si (KR); Yuseong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 18/112,736

(22) Filed: Feb. 22, 2023

(65) Prior Publication Data
US 2023/0267934 A1 Aug. 24, 2023

Related U.S. Application Data

(63) Continuation of application No. PCT/KR2023/001837, filed on Feb. 8, 2023.

(30) Foreign Application Priority Data
Feb. 22, 2022 (KR) .......................... 10-2022-0023209

(51) Int. Cl.
*G10L 15/32* (2013.01)
*G06F 3/14* (2006.01)
(Continued)

(52) U.S. Cl.
CPC ................ *G10L 15/32* (2013.01); *G06F 3/14* (2013.01); *G10L 15/063* (2013.01); *G10L 15/22* (2013.01);
(Continued)

(58) Field of Classification Search
CPC .... A63F 13/30; G06F 3/0481; G06F 3/04817; G06F 3/04842; G06F 3/14; G06F 3/165;
(Continued)

(56) References Cited

U.S. PATENT DOCUMENTS 8,862,467 B1 * 10/2014 Casado ................... G10L 15/22
704/235
9,070,366 B1 6/2015 Mathias et al.
(Continued)

FOREIGN PATENT DOCUMENTS

KR 10-2018-0067977 A 6/2018
KR 10-2018-0108400 A 10/2018
(Continued)

OTHER PUBLICATIONS

International Search Report dated May 9, 2023 issued in International Application No. PCT/KR2023/001837 (9 pages).
(Continued)

*Primary Examiner* — Gerald Gauthier
(74) *Attorney, Agent, or Firm* — Nixon & Vanderhye P.C.

(57) ABSTRACT

A method of operating a display apparatus includes: obtaining situation information for voice recognizer selection, selecting at least one of a plurality of voice recognizers based on the situation information, obtaining a voice recognition result from a voice signal, using the selected at least one voice recognizer, and obtaining a chat message from the voice recognition result.

20 Claims, 14 Drawing Sheets

(51) Int. Cl.
    *G10L 15/06* (2013.01)
    *G10L 15/22* (2006.01)
    *H04N 21/422* (2011.01)
    *H04N 21/475* (2011.01)
    *H04N 21/4788* (2011.01)

(52) U.S. Cl.
    CPC .. *G10L 2015/228* (2013.01); *H04N 21/42203* (2013.01); *H04N 21/475* (2013.01); *H04N 21/4788* (2013.01)

(58) Field of Classification Search
    CPC ...... G06F 3/167; G06F 40/289; G06F 3/0486; G10L 15/02; G10L 15/063; G10L 15/08; G10L 15/18; G10L 15/22; G10L 15/28; G10L 15/30; G10L 15/32; G10L 17/22; G10L 2015/228; G10L 15/065; G10L 15/075; G10L 15/197; H04L 51/04; H04N 21/41265; H04N 21/42203; H04N 21/4312; H04N 21/433; H04N 21/4394; H04N 21/4422; H04N 21/44226; H04N 21/4666; H04N 21/475; H04N 21/4758; H04N 21/4788; H04N 21/812; B25J 13/003; H04M 3/4938
    See application file for complete search history.

(56) References Cited

U.S. PATENT DOCUMENTS

| | | | |
|---|---|---|---|
| 9,570,070 | B2 | 2/2017 | Baldwin et al. |
| 10,217,455 | B2* | 2/2019 | Cho ............... G10L 15/18 |
| 10,629,196 | B2* | 4/2020 | Park ............... G10L 15/22 |
| 10,950,228 | B1* | 3/2021 | Tan ............... G06F 3/167 |
| 11,068,667 | B2 | 7/2021 | Choi et al. |
| 11,189,282 | B2* | 11/2021 | Jeong ............... G10L 15/22 |
| 11,218,592 | B2* | 1/2022 | Kim ............... G06F 3/04842 |
| 11,289,074 | B2 | 3/2022 | Lee |
| 11,587,571 | B2 | 2/2023 | Choi et al. |
| 12,027,168 | B2* | 7/2024 | Cho ............... G10L 15/063 |
| 2005/0159833 | A1* | 7/2005 | Giaimo ............... A63F 13/30 |
| | | | 704/E15.045 |
| 2009/0030687 | A1* | 1/2009 | Cerra ............... G10L 15/065 |
| | | | 704/E15.001 |
| 2009/0030688 | A1* | 1/2009 | Cerra ............... G10L 15/30 |
| | | | 704/E15.001 |
| 2009/0204409 | A1* | 8/2009 | Mozer ............... G10L 15/30 |
| | | | 704/275 |
| 2009/0320076 | A1* | 12/2009 | Chang ............... H04N 21/4394 |
| | | | 348/E5.103 |
| 2010/0145694 | A1* | 6/2010 | Ju ............... G10L 15/22 |
| | | | 704/235 |
| 2011/0054895 | A1* | 3/2011 | Phillips ............... G10L 15/075 |
| | | | 704/235 |
| 2011/0066634 | A1* | 3/2011 | Phillips ............... G10L 15/22 |
| | | | 707/769 |
| 2013/0179168 | A1* | 7/2013 | Bae ............... H04N 21/4312 |
| | | | 704/248 |
| 2015/0039318 | A1* | 2/2015 | Shin ............... G06F 3/04817 |
| | | | 704/275 |
| 2015/0073801 | A1* | 3/2015 | Shin ............... G06F 3/167 |
| | | | 704/246 |
| 2015/0088524 | A1* | 3/2015 | Shin ............... G10L 17/22 |
| | | | 704/275 |
| 2015/0189362 | A1* | 7/2015 | Lee ............... H04N 21/42203 |
| | | | 725/38 |
| 2015/0189390 | A1* | 7/2015 | Sirpal ............... H04N 21/433 |
| | | | 725/51 |
| 2015/0228279 | A1* | 8/2015 | Biadsy ............... G10L 15/197 |
| | | | 704/235 |
| 2015/0279363 | A1* | 10/2015 | Furumoto ............... G10L 15/22 |
| | | | 704/249 |
| 2016/0027440 | A1* | 1/2016 | Gelfenbeyn ............ G10L 15/02 |
| | | | 704/244 |
| 2016/0088333 | A1* | 3/2016 | Bhatia ............... H04N 21/812 |
| | | | 725/34 |
| 2016/0188150 | A1* | 6/2016 | Abida ............... G06F 3/0486 |
| | | | 715/769 |
| 2017/0300831 | A1 | 10/2017 | Gelfenbeyn et al. |
| 2018/0053502 | A1* | 2/2018 | Biadsy ............... G10L 15/08 |
| 2018/0166076 | A1* | 6/2018 | Higuchi ............... B25J 13/003 |
| 2018/0182383 | A1* | 6/2018 | Kim ............... G06F 40/289 |
| 2018/0261220 | A1* | 9/2018 | Higbie ............... G10L 15/22 |
| 2018/0374476 | A1 | 12/2018 | Lee et al. |
| 2019/0130901 | A1* | 5/2019 | Kato ............... G10L 15/08 |
| 2019/0237085 | A1* | 8/2019 | Ryu ............... G06F 3/165 |
| 2019/0279638 | A1* | 9/2019 | Kwon ............... H04N 21/42203 |
| 2020/0074990 | A1 | 3/2020 | Kim et al. |
| 2020/0099785 | A1* | 3/2020 | Kim ............... G06F 3/04842 |
| 2020/0184989 | A1* | 6/2020 | Jang ............... H04N 21/41265 |
| 2020/0302935 | A1* | 9/2020 | Choi ............... G10L 15/28 |
| 2021/0043204 | A1 | 2/2021 | Wang et al. |
| 2021/0065718 | A1 | 3/2021 | Choi |
| 2021/0152870 | A1* | 5/2021 | Lee ............... G06F 3/167 |
| 2021/0217407 | A1* | 7/2021 | Mohapatra ............ G10L 15/063 |
| 2021/0342555 | A1 | 11/2021 | Choi et al. |
| 2023/0267934 | A1* | 8/2023 | Oh ............... G10L 15/32 |
| | | | 704/243 |
| 2023/0350707 | A1* | 11/2023 | Kim ............... G06F 3/0481 |
| 2024/0267580 | A1* | 8/2024 | Lee ............... G06F 3/167 |

FOREIGN PATENT DOCUMENTS

| | | |
|---|---|---|
| KR | 10-2019-0001434 | 1/2019 |
| KR | 10-1949731 | 2/2019 |
| KR | 10-2020-0092166 | 8/2020 |
| KR | 10-2021-0017392 | 2/2021 |
| KR | 10-2021-0027991 A | 3/2021 |
| KR | 10-2225984 | 3/2021 |
| KR | 10-2021-0039049 A | 4/2021 |

OTHER PUBLICATIONS

Miranda et al., "How to Build Domain Specific Automatic Speech Recognition Models on GPUs" (Dec. 2019), https://developer.nvidia.com/blog/how-to-build-domain-specific-automatic-speech-recognition-models-on-gpus/, 4 pages.

Taubenheim et al., "GPU-Accelerated Speech to Text with Kaldi: A Tutorial on Getting Started" (Oct. 2019), https://developer.nvidia.com/blog/gpu-accelerated-speech-to-text-with-kaldi-a-tutorial-on-getting-started/, 5 pages.

* cited by examiner

DISPLAY APPARATUS AND OPERATING METHOD THEREOF

CROSS-REFERENCE TO RELATED APPLICATIONS

This application is a continuation of International Application No. PCT/KR2023/001837 designating the United States, filed on Feb. 8, 2023, in the Korean Intellectual Property Receiving Office and claiming priority to Korean Patent Application No. 10-2022-0023209, filed on Feb. 22, 2022, in the Korean Intellectual Property Office, the disclosures of which are incorporated by reference herein in their entireties.

BACKGROUND

Field

The disclosure relates to a display apparatus and an operating method thereof, and for example, to a display apparatus for more accurately performing voice recognition and an operating method of the display apparatus.

Description of Related Art

With the development of multimedia and network technology, applications for sharing specific interests or activities among people have increased. For example, while watching broadcast content transmitted to a plurality of users in real time, people may share opinions or feelings about the broadcast content using chat services.

When a user inputs a chat message using an electronic device, the electronic device may transmit the chat message input by the user to a chat server. The chat server may receive chat messages from a plurality of electronic device participating in a chat room and transmit the received chat messages to all of the plurality of electronic devices belonging to the chat room to provide a chat service.

A user may directly type and input a chat message using an electronic device, or may input a chat message through voice utterance. In the latter case, the electronic device may perform voice recognition on a voice signal uttered by the user, may obtain a chat message corresponding to a voice recognition result, and may transmit the chat message to a chat server. When a user uses a chat service while watching content, generally, the user inputs a chat message suitable for a surrounding situation such as the subject of the content or chat content. However, when the electronic device performs voice recognition, the electronic device does not consider a surrounding situation such as the subject of content or chat content, and thus, may fail to more accurately recognize a voice signal uttered by the user.

SUMMARY

Embodiments of the disclosure provide a display apparatus including a plurality of voice recognizers including learning models that are trained with different training data, and an operating method of the display apparatus.

Embodiments of the disclosure provide a display apparatus that obtains situation information for voice recognizer selection and selects at least one of a plurality of voice recognizers based on the situation information, and an operating method of the display apparatus.

Embodiments of the disclosure provide a display apparatus that provides a more accurate chat message by filtering chat messages corresponding to a plurality of voice recognition results based on a weight matrix, and an operating method of the display apparatus.

According to an example embodiment of the disclosure, a display apparatus includes: a memory including one or more instructions, and a processor configured to execute the one or more instructions stored in the memory to: obtain situation information for voice recognizer selection, select at least one of a plurality of voice recognizers, based on the situation information, obtain a voice recognition result from a voice signal using the selected at least one voice recognizer, and obtain a chat message from the voice recognition result.

The display apparatus may further include: a display, wherein the processor is further configured to execute the one or more instructions to: control the display to display content and chat messages of a chat room related to the content, wherein the situation information includes at least one of content information about the content or chat information related to chatting.

The chat information may include information about at least one of a title of the chat room or content of the chat messages, and the content information may include at least one of subject of the content, a voice signal output together with the content, subtitles, a program name of the content, a content topic, a content type, a content genre, a channel type, a broadcasting station, a producer, a cast, a director, or a content broadcast time.

Each of the plurality of voice recognizers may include a learning model trained with one or more different training data, wherein the different training data include at least one of training data by language, training data by field, training data by program type, training data by program genre, training data by broadcasting station, training data by channel, training data by producer, training data by cast, training data by director, training data by region, personalized training data obtained based on user information, or training data obtained based on information about a group to which the user belongs.

The user information may include at least one of user profile information, viewing history information of the user, or chat message content information input by the user, and the information about the group to which the user belongs may include at least one of profile information of people whose user information overlaps the user by a reference value or more, viewing history information of the people, or chat message content information input by the people.

Each of the plurality of voice recognizers may include a learning model trained with one or more different training data, wherein the plurality of voice recognizers are identified by label information indicating a type of training data used to train the learning model, wherein the processor is further configured to execute the one or more instructions to select at least one of the plurality of voice recognizers based on a similarity between the situation information and the label information.

The processor may be further configured to, based on the selected voice recognizers being plural, obtain a plurality of voice recognition results from the user's voice signal using the selected plurality of voice recognizers.

The display apparatus may further include a display, wherein the processor is further configured to execute the one or more instructions to filter a specified number of or fewer voice recognition results based on a weight matrix from among the plurality of voice recognition results, obtain chat messages corresponding to the filtered voice recognition results, and output the chat messages through the display.

The processor may be further configured to execute the one or more instructions to, based on a plurality of chat messages being output through the display, transmit one chat message selected by the user from among the plurality of chat messages to a chat server.

The processor may be further configured to execute the one or more instructions to update the weight matrix based on the user's selection.

According to an example embodiment of the disclosure, a method of operating a display apparatus includes: obtaining situation information for voice recognizer selection, selecting at least one of a plurality of voice recognizers based on the situation information, obtaining a voice recognition result from a user's voice signal, using the selected at least one voice recognizer, and obtaining a chat message from the voice recognition result.

According to an example embodiment of the disclosure, a non-transitory computer-readable recording medium has recorded thereon a program which, when executed by a processor of a display apparatus, causes the display apparatus to perform operations including: obtaining situation information for voice recognizer selection, selecting at least one of a plurality of voice recognizers based on the situation information, obtaining a voice recognition result from a user's voice signal, using the selected at least one voice recognizer, and obtaining a chat message from the voice recognition result.

A display apparatus and an operating method thereof according to various example embodiments of the disclosure may include learning models that are trained with different training data.

A display apparatus and an operating method thereof according to various example embodiments of the disclosure may obtain situation information for voice recognizer selection and may select at least one of a plurality of voice recognizers based on the situation information.

A display apparatus and an operating method thereof according to various example embodiments of the disclosure may provide a more accurate chat message by filtering chat messages corresponding to a plurality of voice recognition results based on a weight matrix.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
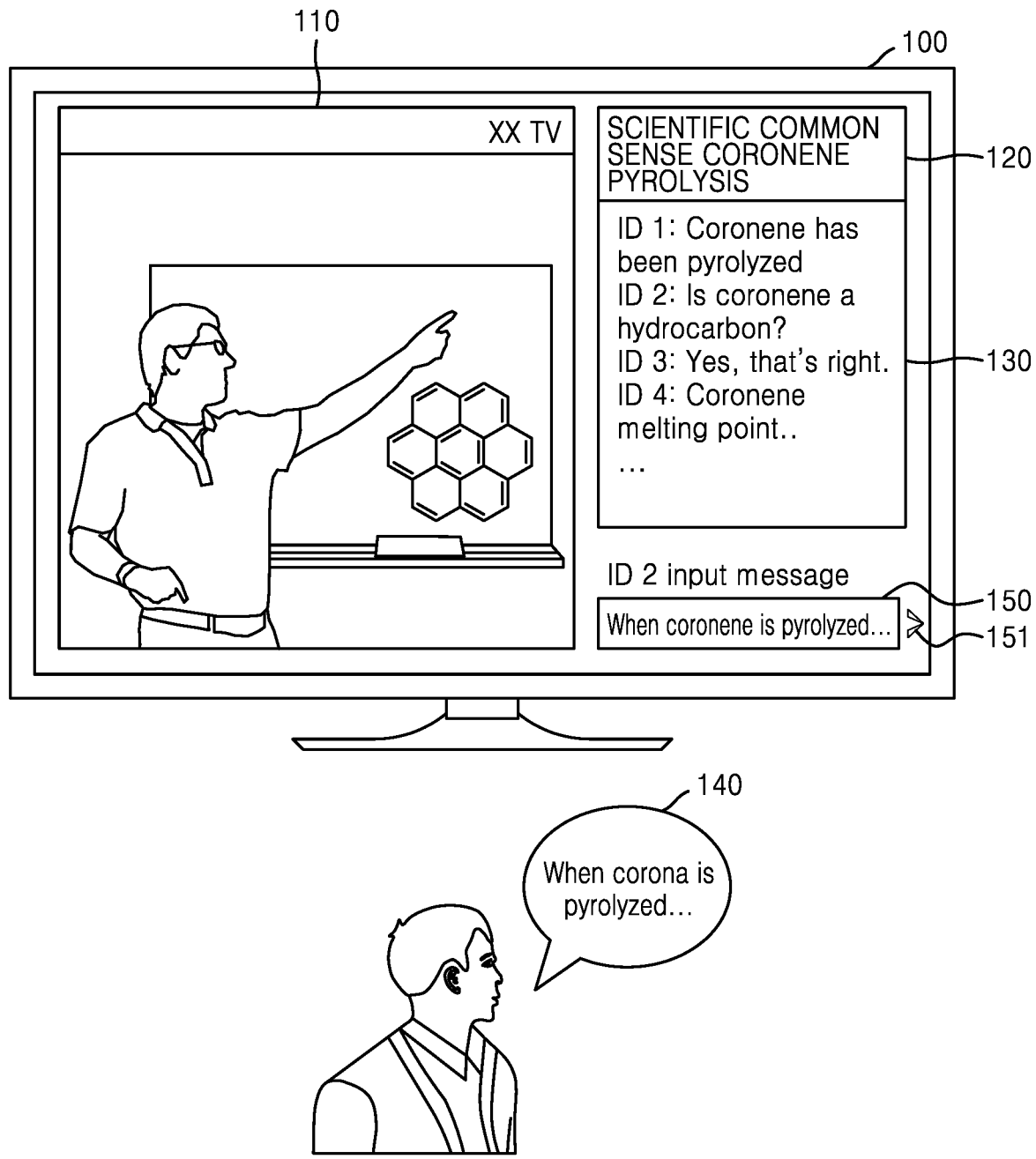
FIG. 1 is a diagram illustrating a display apparatus obtaining a chat message from a user's voice signal and outputting the chat message on a screen, according to various embodiments.

Throughout the disclosure, the expression "at least one of a, b or c" indicates only a, only b, only c, both a and b, both a and c, both b and c, all of a, b, and c, or variations thereof.

Hereinafter, various example embodiments of the disclosure will be described in greater detail with reference to the accompanying drawings. However, the disclosure may be embodied in many different forms and is not limited to the embodiments of the disclosure set forth herein.

In the disclosure, general terms that have been widely used nowadays are selected in consideration of functions of the disclosure, but various other terms may be selected according to the intentions of technicians in the art, precedents, new technologies, etc. Accordingly, the terms used herein should be defined not based on the names thereof but based on the meanings thereof and the whole context of the disclosure.

The terms used herein are for the purpose of describing certain embodiments of the disclosure only and are not intended to be limiting of the disclosure.

Throughout the disclosure, when a component is referred to as being "connected" to another component, it will be understood to include that the component is "directly connected" to the other component or is "electrically connected" to the other component with another component therebetween.

In the disclosure and in the claims, "the" and similar referents may be used to indicate both singular and plural forms. Operations for describing a method according to the disclosure may be performed in a suitable order unless the context clearly dictates otherwise. The disclosure is not limited to the order of the operations described.

The expressions "in some embodiments", "in an embodiment" and the like appearing in various parts of the disclosure are not necessarily referring to the same embodiment.

Various embodiments of the disclosure may be represented by functional block configurations and various operations. Some or all of functional blocks may be implemented by various numbers of hardware and/or software configurations for performing certain functions. For example, the functional blocks of the disclosure may be implemented by one or more microprocessors or by circuit configurations for a certain function. For example, the functional blocks of the disclosure may be implemented in various programming or scripting languages. The functional blocks may be implemented in an algorithm executed by one or more processors. In the disclosure, the prior art may be employed for electronic configuration, signal processing, and/or data processing. The terms such as "mechanism", "element", "means", and "configuration" may be used widely and are not limited as mechanical and physical configurations.

Lines or members connecting elements illustrated in the drawings are merely illustrative of functional connections and/or physical or circuit connections. In an actual device, connections between components may be represented by various functional connections, physical connections, or circuit connections that are replaceable or added.

Terms such as " . . . unit" or " . . . module" refers to a unit that performs at least one function or operation, and the unit may be implemented as hardware or software or as a combination of hardware and software.

In the disclosure, the term "user" refers to a person who uses a display apparatus, and may include a consumer, an evaluator, a viewer, an administrator, or an installer.

Various example embodiments of the disclosure will be described in greater detail below with reference to the drawings.

FIG. 1 is a diagram illustrating a display apparatus obtaining a chat message from a user's voice signal and outputting the chat message on a screen, according to various embodiments.

Referring to FIG. 1, a display apparatus 100 may be implemented as any of various electronic devices capable of outputting content through a screen.

In an embodiment of the disclosure, the display apparatus 100 may receive content from a content provider. The content provider may refer to a terrestrial broadcasting station or cable broadcasting station, an over-the-top (OTT) service provider, or an Internet protocol television (IPTV) service provider which provides various content including video to consumers. For example, the display apparatus 100 may receive broadcast content in real time from a broadcasting station through a tuner unit.

As shown in FIG. 1, the display apparatus 100 may output content 110 on a screen.

The display apparatus 100 may communicate with a chat server (not shown) that provides a chat service. The display apparatus 100 may transmit and receive data to and from the chat server through mutual networking with the chat server.

The chat server may receive metadata about content from the content provider that provides the content. For example, the chat server may receive metadata including electronic program guide (EPG) information about a broadcast program or content attribute information indicating the subject of content from a broadcasting station.

The chat server may open a chat room related to content using metadata about the content. For example, the chat server may obtain information such as a program name, a content topic, a broadcast time, and main characters from EPG information or content attribute information, and may determine a title of a chat room based on the information. For example, the chat server may determine the program name as the title of the chat room. The chat server may open the chat room with the determined title.

In an embodiment of the disclosure, the display apparatus 100 may access the chat server based on the web, may receive the title of the chat room opened by the chat server and a chat message, and may output the title and the chat message on a screen.

As shown in FIG. 1, the display apparatus 100 may output a title 120 of a chat room and a chat message 130 on a screen.

A user may input a chat message using the display apparatus 100.

In an embodiment of the disclosure, the user may input a chat message as a voice signal to the display apparatus 100. To this end, the display apparatus 100 may include a microphone for collecting an audio signal, or may be connected to an external microphone and may receive a collected audio signal from the external microphone.

In an embodiment of the disclosure, the display apparatus 100 may include a voice recognizer for recognizing a voice signal uttered by the user. In an embodiment of the disclosure, the voice recognizer may perform an automatic speech recognition (ASR) operation. The ASR operation may involve performing speech-to-text (STT) processing that recognizes and interprets a language spoken by a person and converts content into text data of the language.

In an embodiment of the disclosure, one voice recognizer may include one or more learning models. In an embodiment of the disclosure, one learning model may be trained with one type of training data. In an embodiment of the disclosure, one learning model may be trained with two or more types of different training data.

In an embodiment of the disclosure, the display apparatus 100 may determine whether the user's voice signal is a signal for inputting a chat message or a signal for controlling the display apparatus 100 itself. In an embodiment of the disclosure, the display apparatus 100 may identify whether the user is using a chat service. For example, in a state where the content 110 and the chat room are not output together and only the content 110 is output, when the user utters a voice signal, the display apparatus 100 may recognize the voice signal as a control signal for controlling the display apparatus 100.

When the user does not use a chat service, the display apparatus 100 may perform voice recognition on the user's utterance using a basic voice recognizer. The basic voice recognizer may be a voice recognizer used to recognize a voice signal for controlling a basic operation of the display apparatus 100 itself. For example, the basic voice recognizer may be a voice recognizer including a voice recognition model trained on voice signals for controlling a basic operation of the display apparatus 100 itself such as power off, power on, channel up, channel down, volume up, or volume down. The display apparatus 100 may perform an operation such as an operation of increasing a volume or changing a channel according to a result of performing voice recognition on the user's utterance using the basic voice recognizer.

In an embodiment of the disclosure, the display apparatus 100 may further include a plurality of voice recognizers, in addition to the basic voice recognizer. In an embodiment of the disclosure, each of the plurality of voice recognizers may include a learning model trained with one or more different raining data.

In an embodiment of the disclosure, the different raining data may refer to training data for various domains or categories. For example, the different training data may include at least one of training data by language, training data by field, training data by program type, training data by program genre, training data by broadcasting station, training data by channel, training data by producer, training data by cast, training data by director, training data by region, personalized training data obtained based on user information, or training data obtained based on information about a group to which the user belongs.

For example, in FIG. 1, it is assumed that the display apparatus 100 includes a voice recognizer including a learning model trained with training data on a chemical field. Also, it is assumed that the display apparatus 100 includes a voice recognizer including a learning model trained with training data in which a program genre is an education program.

In an embodiment of the disclosure, the voice recognizer may be identified by label information indicating a type of training data used to train a learning model. When one learning model is trained with one training data, the voice recognizer may be identified by label information indicating a type of the one training data. When one learning model is trained with a plurality of types of training data, the voice recognizer including the learning model may be identified by a group of a plurality of label information.

In an embodiment of the disclosure, the display apparatus 100 may select at least of a plurality of voice recognizers using situation information.

In an embodiment of the disclosure, the situation information that is information collected to select a voice recognizer may refer to information indicating a surrounding situation affecting voice recognizer selection.

In an embodiment of the disclosure, when it is determined that the user is using a chat service, the display apparatus 100 may obtain situation information.

In an embodiment of the disclosure, the situation information may include at least one of content information or chat information.

In an embodiment of the disclosure, the content information may be information related to the content 110 output on the screen, and the chat information may be information about at least one of the title 120 of the chat room or the chat message 130 output on the screen.

In an embodiment of the disclosure, the display apparatus 100 may obtain situation information including at least one of content information or chat information, and may select at least one of a plurality of voice recognizers based on the situation information.

For example, in FIG. 1, the display apparatus 100 may identify, from at least one of the title 120 of the chat room, the chat message 130, or content information such as a content name, a content topic, or a content genre, that the content 110 includes content about a molecular structure, the content 110 is a program made by XX broadcasting station that produces educational broadcast programs, and the content 110 and chat content are about coronene or pyrolysis of coronene.

In an embodiment of the disclosure, the display apparatus 100 may compare the situation information with label information of a voice recognizer. The display apparatus 100 may select at least one of a plurality of voice recognizers based on a similarity between the situation information and the label information.

For example, in FIG. 1, the display apparatus 100 may select a voice recognizer including a learning model trained with training data on a chemical field, as a voice recognizer suitable for the situation information, from among the plurality of voice recognizers. The display apparatus 100 may select a voice recognizer including a learning model trained with training data in which a genre is an educational program, as a voice recognizer suitable for the situation information, from among the plurality of voice recognizers.

For convenience of explanation, the voice recognizer including the learning model trained with training data on a chemical field may be referred to as a first voice recognizer, and the voice recognizer including the learning model trained with training data that is an educational program may be referred to as a second voice recognizer.

In an embodiment of the disclosure, the display apparatus 100 may obtain a voice recognition result from the user's voice signal, using the selected voice recognizer. In an embodiment of the disclosure, when a plurality of voice recognizers are selected, the display apparatus 100 may obtain a plurality of voice recognition results from the user's voice signal using the plurality of voice recognizers.

In an embodiment of the disclosure, the voice recognition result may be in the form of text such as words or a sentence. The voice recognition result may include a probability value indicating that the voice signal is to be recognized as the text.

It is assumed in FIG. 1 that the user intends to utter 'when coronene is pyrolyzed' but incorrectly utters 'when corona is pyrolyzed'.

The display apparatus 100 may obtain a first voice recognition result corresponding to a voice signal 140 of the user using the first voice recognizer. In this case, because the first voice recognizer performs voice recognition using a learning model trained with training data of a chemical field, the first voice recognizer is likely to identify 'corona' as 'coronene'. For example, the first voice recognizer may recognize the voice signal 140 of the user as a first voice recognition result of 'when coronene is pyrolyzed', with a probability value of, for example, 85%.

The display apparatus 100 may obtain a second voice recognition result corresponding to the voice signal 140 of the user using the second voice recognizer. For example, when a learning model included in the second voice recognizer is much more trained with training data related to an educational program for corona than an educational program for coronene, the second voice recognizer is more likely to identify the word 'corona' uttered by the user as 'corona' than as 'coronene'. In this case, the second voice recognizer may recognize the voice signal 140 of the user as a second voice recognition result of 'when corona is pyrolyzed' with a probability value of, for example, 70%.

In an embodiment of the disclosure, when the display apparatus 100 obtains a plurality of voice recognition results using a plurality of voice recognizers, the display apparatus 100 may filter the plurality of voice recognition results using a weight matrix.

In an embodiment of the disclosure, the weight matrix may be a matrix including a weight of each of the plurality of voice recognizers. The weight of the voice recognizer may be information indicating the reliability or accuracy of a voice recognition result. The weight for each voice recognizer may be initially set to the same value, and then may be changed according to a degree to which the user selects a voice recognition result.

In an embodiment of the disclosure, the display apparatus 100 may apply a first weight of the first voice recognizer included in the weight matrix to the probability value of the first voice recognition result, and may apply a second weight of the second voice recognizer to the probability value of the second voice recognition result.

For example, in the above example, when the first weight of the first voice recognizer is 0.5 and the second weight of the second voice recognizer is 0.3, the display apparatus 100 may multiply the first weight of 0.5 by the probability value of 85% of the first voice recognition result, and may multiply the second weight of 0.3 by the probability value of 70% of the second voice recognition result.

In an embodiment of the disclosure, the display apparatus 100 may determine text corresponding to a voice recognition result having a value equal to or higher than a reference value from among weighted probability values as a chat message to be output on the screen.

When there are a plurality of text having a value equal to or greater than a reference value from among weighted probability values, the display apparatus 100 may determine text having a higher value as a chat message to be output on the screen. For example, in the above example, because a value obtained by applying the first weight of the first voice recognizer to the probability value of 85% with which the voice signal is recognized as the first voice recognition result is greater than a value obtained by applying the second weight of the second voice recognizer to the probability value of 70% with which the voice signal is recognized as the second voice recognition result, the display apparatus 100 may determine text 'when coronene is pyrolyzed', which is the first voice recognition result obtained by the first voice recognizer, as a chat message to be output on the screen.

In an embodiment of the disclosure, the display apparatus 100 may output a chat message through a chat message input box 150 of FIG. 1.

The display apparatus 100 may directly transmit the chat message input through the chat message input box 150 to the chat server, or may receive the user's confirmation and may transmit the chat message to the chat server. The user confirmation may include at least one of a case where a certain period of time elapses after the chat message is output, where a user input indicating that the chat message is incorrectly input is not received for a certain period of time, or where the user's selection of a check mark 151 next to the chat message input box 150 is received.

The chat server may receive the chat message from the display apparatus 100, and may relay the chat message by transmitting the received chat message to all of a plurality of display apparatuses belonging to the chat room.

As such, according to an embodiment of the disclosure, because the display apparatus 100 performs voice recognition by considering a surrounding situation such as the content 110, the title 120 of the chat room, and the chat message 130, even when the user utters a voice signal that does not match the content 110, the title 120 of the chat room, or the subject of the chat message 130, the display apparatus 100 may recognize and process the user's voice signal as a signal matching the surrounding situation.

Figure 2:
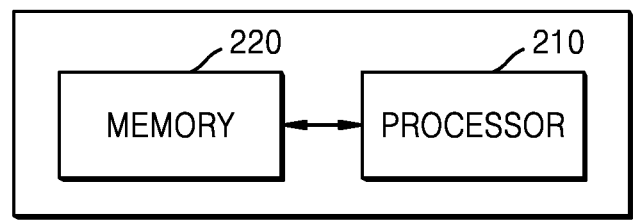
FIG. 2 is a block diagram illustrating an example configuration of a display apparatus, according to various embodiments.

FIG. 2 is a block diagram illustrating an example configuration of a display apparatus, according to various embodiments.

The display apparatus 200 of FIG. 2 may be an example of the display apparatus 100 of FIG. 1.

In an embodiment of the disclosure, the display apparatus 200 may be implemented as any of various types of electronic devices capable of outputting content through a screen. The display apparatus 200 may include a microphone for collecting an audio signal, or may receive a collect audio signal from an external microphone. For example, the display apparatus 200 may be any of various types of electronic devices in which a microphone or an artificial intelligence (AI) speaker is installed or which is connected to an external microphone or an external AI speaker, such as, for example, and without limitation, a digital television, a wearable device, a smartphone, any of various personal computers, e.g., a desktop computer, a table PC, a laptop computer, a personal digital assistant (PDA), a global positioning system (GPS) device, a smart mirror, an electronic book terminal, a navigation device, a kiosk, a digital camera, a wearable device, a smart watch, a home networking device, a security device, a medical device, or the like. The display apparatus 200 may be of a fixed type or a movable type.

The display apparatus 200 may be a display inserted into a front surface of any of various home appliances such as a refrigerator or a washing machine.

The display apparatus 200 according to various embodiments of the disclosure may be included in or mounted on any of various types of electronic devices such as, for example, and without limitation, a display inserted into a front surface of a digital television, a wearable device, a smartphone, any of various PCs, e.g., a desktop computer, a tablet PC, or a laptop computer, a PDA, a media player, a micro server, a GPS device, a smart mirror, an electronic book terminal, a navigation device, a kiosk, a digital camera, a wearable device, a smart watch, a home networking device, a security device, a medical device, a refrigerator, a watching machine, any of other home appliances, or the like.

The display apparatus 200 may be implemented as a curved display apparatus including a screen with a curvature or a flexible display apparatus with an adjustable curvature as well as a flat display apparatus. An output resolution of the display apparatus 200 may have a resolution such as high definition (HD), full HD, ultra HD, or a resolution better than ultra HD.

Referring to FIG. 2, the display apparatus 200 may include a processor (e.g., including processing circuitry) 210 and a memory 220.

The memory 220 according to an embodiment of the disclosure may store at least one instruction. The memory 220 may store at least one program executed by the processor 210. The memory 220 may store a pre-defined operation rule or program. Also, the memory 220 may store data input to the display apparatus 200 or output from the display apparatus 200.

The memory 220 may include at least one type of storage medium of a flash memory type storage medium, a hard disk type storage medium, a multimedia card micro type storage medium, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

In an embodiment of the disclosure, the memory 220 may include one or more instructions for obtaining situation information.

In an embodiment of the disclosure, the memory 220 may include one or more instructions for selecting at least one of a plurality of voice recognizers based on the situation information.

In an embodiment of the disclosure, the memory 220 may include one or more instructions for obtaining a voice recognition result from a user's voice signal.

In an embodiment of the disclosure, the memory 220 may include one or more instructions for obtaining a chat message from the voice recognition result.

In an embodiment of the disclosure, the memory 220 may store a voice recognizer including at least one neural network and/or a pre-defined operation rule or AI model.

In an embodiment of the disclosure, at least one voice recognizer stored in the memory 220 may include one or more instructions for obtaining a voice recognition result from the user's voice signal using the neural network and/or the pre-defined operation rule or AI model included in the voice recognizer.

In an embodiment of the disclosure, each of a plurality of voice recognizers may include a learning model trained with one or more different training data. The different training data may include at least one of training data by language, training data by field, training data by program type, training data by program genre, training data by broadcasting station, training data by channel, training data by producer, training data by cast, training data by director, training data by region, personalized training data obtained based on user information, or training data obtained based on information about a group to which the user belongs.

In an embodiment of the disclosure, the plurality of voice recognizers may be identified by label information indicating a type of training data used to train a learning model.

In an embodiment of the disclosure, the processor 210 may include various processing circuitry and controls an overall operation of the display apparatus 200. The processor 210 may control the display apparatus 200 to function, by executing one or more instructions stored in the memory 220.

In an embodiment of the disclosure, the processor 210 may obtain situation information for voice recognizer selection.

In an embodiment of the disclosure, the processor 210 may obtain situation information including at least one of chat information related to chatting or content information related to content.

In an embodiment of the disclosure, the processor 210 may select at least one of the plurality of voice recognizers based on the situation information.

In an embodiment of the disclosure, the processor 210 may select at least one of the plurality of voice recognizers based on a similarity between the situation information and the label information.

In an embodiment of the disclosure, the processor 210 may obtain a voice recognition result from the user's voice signal, using the selected at least one voice recognizer.

In an embodiment of the disclosure, when a plurality of voice recognizers are selected, the processor 210 may obtain a plurality of voice recognition results from the user's voice signal using the plurality of voice recognizers.

In an embodiment of the disclosure, the processor 210 may obtain a chat message according to the voice recognition result.

Figure 3:
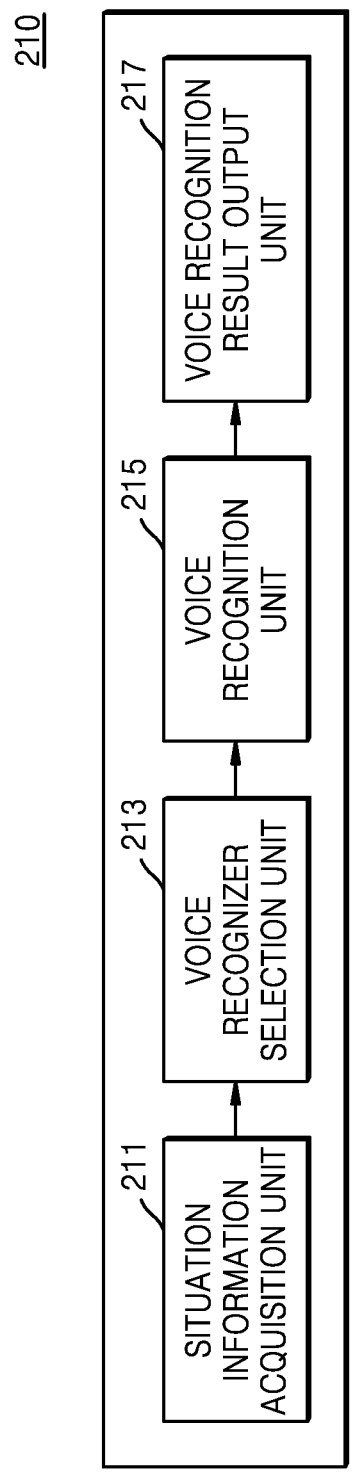
FIG. 3 is a block diagram illustrating an example configuration of a processor included in a display apparatus, according to various embodiments.

FIG. 3 is a block diagram illustrating an example configuration of a processor included in a display apparatus, according to various embodiments.

In an embodiment of the disclosure, the processor 210 of FIG. 3 may be the processor 210 included in the display apparatus 200 of FIG. 2.

In an embodiment of the disclosure, the processor 210 may include a situation information acquisition unit 211, a voice recognizer selection unit 213, a voice recognition unit 215, and a voice recognition result output unit 217. It will be understood that each of the units above may include various processing circuitry and/or executable program instructions.

In an embodiment of the disclosure, the situation information acquisition unit 211, the voice recognizer selection unit 213, the voice recognition unit 215, and the voice recognition result output unit 217 may be included as modules in the processor 210. A module may refer to a functional and structural combination of hardware for performing the technical idea of the disclosure and software for driving the hardware. For example, the module may refer to a logical unit of certain code and a hardware resource for performing the certain code, and is not necessarily limited to physically connected code or one type of hardware.

In an embodiment of the disclosure, the situation information acquisition unit 211 may obtain situation information for selecting a voice recognizer. The situation information that is information indicating various surrounding situations may include at least one of chat information related to chatting or content information about content.

In an embodiment of the disclosure, the content information that is information related to content may include at least one of semantic information obtained by analyzing content output on a screen or metadata information related to a program received from a broadcasting station or the like.

In an embodiment of the disclosure, the chat information that is information related to chatting may include information about at least one of a title of a chat room or chat message content output on the screen.

In an embodiment of the disclosure, the situation information acquisition unit 211 may transmit the situation information to the voice recognizer selection unit 213.

In an embodiment of the disclosure, the voice recognizer selection unit 213 may receive the situation information from the situation information acquisition unit 211, and may select at least one of a plurality of voice recognizers based on the situation information.

In an embodiment of the disclosure, each of the plurality of voice recognizers may include a learning model trained with one or more different training data. Also, the voice recognizer may be identified by label information indicating a type of training data used to train a learning model.

In an embodiment of the disclosure, the voice recognizer selection unit 213 may select at least one of the plurality of voice recognizers by comparing the situation information with the label information. For example, the voice recognizer selection unit 213 may select, based on a similarity between the situation information and the label information, a voice recognizer identified by label information having a high similarity with the situation information. In an embodiment of the disclosure, the voice recognizer selection unit 213 may select one voice recognizer or may select a plurality of voice recognizers, according to a similarity between the situation information and the label information.

In an embodiment of the disclosure, the voice recognition unit 215 may include a plurality of voice recognizers.

In an embodiment of the disclosure, each of the plurality of voice recognizers may include a learning model trained with one or more different training data.

In an embodiment of the disclosure, the voice recognition unit 215 may perform voice recognition on a voice signal of a user, using the voice recognizer selected by the voice recognizer selection unit 213 from among the plurality of voice recognizers.

In an embodiment of the disclosure, the voice recognition unit 215 may perform speech-to-text (STT) processing of converting a voice signal of a person into text data. The voice recognition unit 215 may analyze the voice signal uttered by the user, may compare the voice signal with a learning model, and may perform processing of converting the voice signal into text data corresponding to the voice signal.

In an embodiment of the disclosure, the voice recognition unit 215 may obtain text and a probability value as a voice recognition result of the voice signal of the user using one or more voice recognizers.

In an embodiment of the disclosure, when one voice recognizer derives a plurality of voice recognition results, the voice recognition unit 215 may obtain a voice recognition result having a highest probability value as a final voice recognition result of the voice recognizer.

In an embodiment of the disclosure, the voice recognition unit 215 may update the learning model included in the voice recognizer based on at least one of the voice signal of the user or the situation information.

Taking the word 'corona' as an example, even when the user utters 'corona' before the outbreak of corona virus, the voice recognizer may not recognize well 'corona'. For example, when the learning model is not updated, the voice recognizer does not understand new words, thereby degrading performance. Accordingly, in an embodiment of the disclosure, the voice recognition unit 215 may update the learning model in real time, or at regular intervals, or whenever new situation information or voice signal is obtained using the situation information and the voice signal, to improve the performance of the voice recognizer.

In an embodiment of the disclosure, the voice recognition unit 215 may update the learning model included in the voice recognizer based on the user's voice signal. That is, the voice recognition unit 215 may allow the learning model included in the voice recognizer selected according to the user's voice signal to be additionally trained on the user's voice signal. Whenever a voice signal is obtained from the user, the voice recognition unit 215 may perform a process of labeling, annotating, or tagging the voice signal, so that the learning model is additionally trained on the voice signal of the user.

In an embodiment of the disclosure, the voice recognition unit 215 may update the learning model included in the voice recognizer based on situation information. The voice recognition unit 215 may allow the learning model included in the selected voice recognizer to be additionally trained on the situation information. The voice recognition unit 215 may allow the learning model to be additionally trained on the situation information whenever the display apparatus 200 obtains the situation information, at regular intervals, or at random intervals.

In an embodiment of the disclosure, the voice recognition unit 215 may receive an updated learning model from an external computing device (not shown) at regular intervals or at random intervals. For example, the external device such as a server may receive the user's voice signal or situation information from the display apparatus 200, and may allow a learning model to be additionally trained on the voice signal or the situation information. The computing device may transmit the trained model through a communication network to the voice recognition unit 215, so that the learning model included in the voice recognizer is updated to the new learning model.

In an embodiment of the disclosure, the voice recognition unit 215 may be included in the external computing device, not inside the display apparatus 200. In this case, the display apparatus 200 may transmit information about the voice recognizer selected by the voice recognizer selection unit 213 to the computing device, and may transmit the user's voice signal to the computing device. The computing device may perform voice recognition on the user's voice signal using the voice recognizer selected by the voice recognizer selection unit 213, and may transmit a result obtained after performing the voice recognition to the display apparatus 200.

In an embodiment of the disclosure, the voice recognition unit 215 may obtain one final voice recognition result for each voice recognizer, and may transmit the final voice recognition result to the voice recognition result output unit 217.

In an embodiment of the disclosure, the voice recognition result output unit 2187 may receive voice recognition results as text from one or more voice recognizers included in the voice recognition unit 215, and may select one or more text to be output on the screen.

In an embodiment of the disclosure, the voice recognition result output unit 217 may select text, the number of which is equal to or less than a reference value, to be output on the screen by applying a weight matrix to a probability value of a voice recognition result.

In an embodiment of the disclosure, the voice recognition result output unit 217 may output the selected one or more text through the screen.

Figure 4:
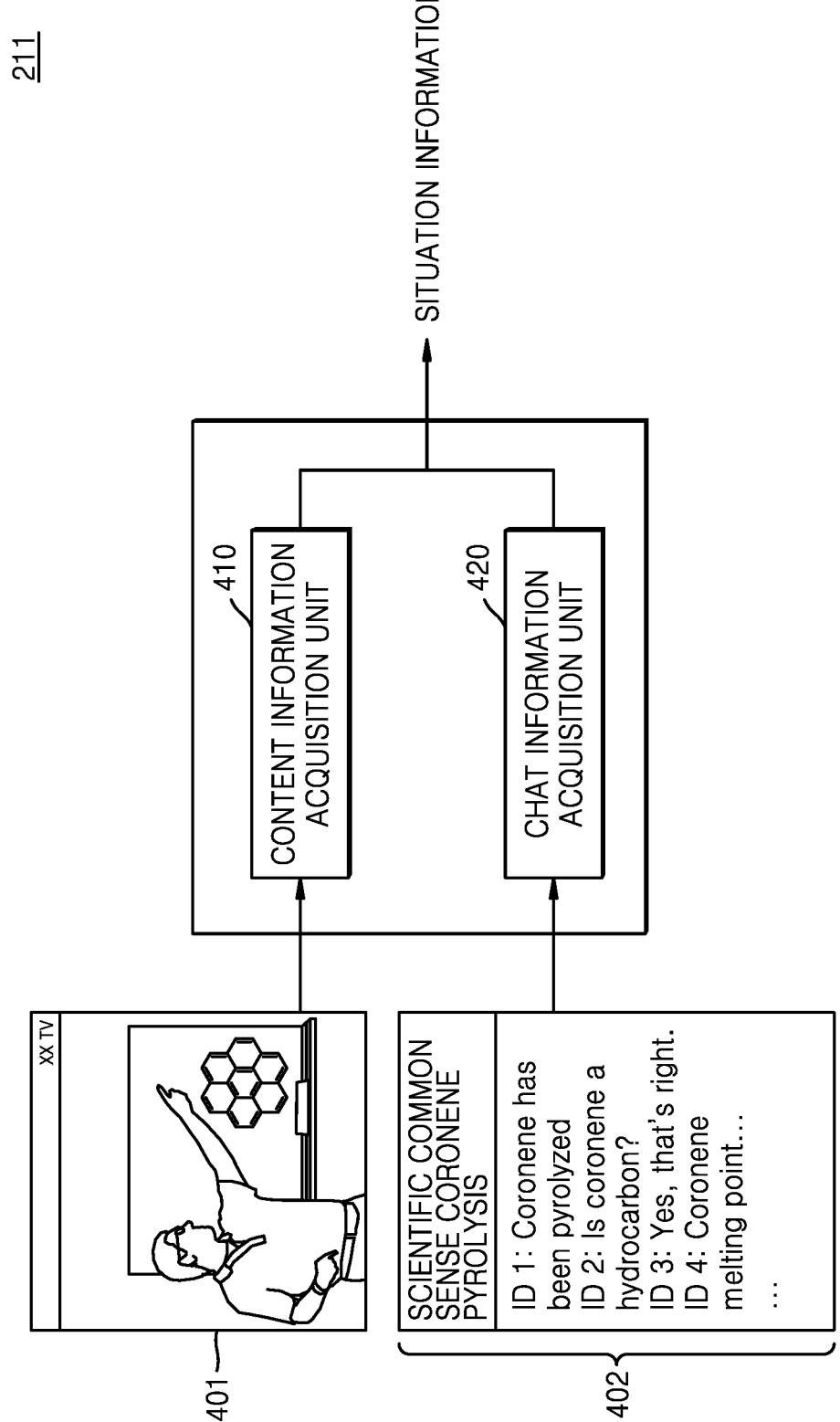
FIG. 4 is a block diagram illustrating an example configuration of a situation information acquisition unit included in the processor of FIG. 3, according to various embodiments.

FIG. 4 is a block diagram illustrating an example configuration of a situation information acquisition unit included in a processor of FIG. 3, according to various embodiments.

Referring to FIG. 4, the situation information acquisition unit 211 may include a content information acquisition unit 410 and a chat information acquisition unit 420. As noted above, each of the units may include various processing circuitry and/or executable program instructions.

In an embodiment of the disclosure, the content information acquisition unit 410 may obtain content information about content 401 output on a screen. The content information may include at least one of semantic information or program-related metadata.

In an embodiment of the disclosure, the content information acquisition unit 410 may obtain semantic information from the content. The content information acquisition unit 410 may obtain semantic information from at least one of an object type, a voice signal output together with the content, or subtitles output together with the content.

In an embodiment of the disclosure, the content information acquisition unit 410 may identify a type of an object included in the content by performing object detection on the content. The content information acquisition unit 410 may detect the object from the content using image processing technology or AI technology. For example, the content information acquisition unit 410 may perform object detection, by classifying the object from the content using a deep neural network (DNN) including two or more hidden layers, and identifying a location of the object. When the object is a person, the content information acquisition unit 410 may identify the person. For example, the content information acquisition unit 410 may detect a face from the object using at least one neural network, may extract features of the detected face, and may identify the person by matching facial features of the person to facial features that are previously trained. The content information acquisition unit 410 may recognize facial expression of the person using the facial features of the person.

The content information acquisition unit 410 may analyze the subtitles output together with the content and may detect a keyword in the subtitles or obtain meaning of the keyword.

In an embodiment of the disclosure, the content information acquisition unit 410 may extract a feature vector from the voice signal output together with the content, and may perform voice recognition by comparing the feature vector with a voice model database. The content information acquisition unit 410 may pre-process an audio signal to convert the audio signal into a spectrum feature suitable for a machine learning operation. The content information acquisition unit 410 may convert a sound source into a signal in a frequency domain using a mel-frequency cepstral coefficient (MFCC) algorithm, and may obtain feature information from the sound source. The content information acquisition unit 410 may obtain a recognition result by comparing the extracted feature vector with a trained reference pattern.

In an embodiment of the disclosure, the content information acquisition unit 410 may obtain program-related metadata. In an embodiment of the disclosure, the content information acquisition unit 410 may obtain metadata about content from a content provider that provides the content. For example, the content information acquisition unit 410 may receive metadata about content including at least one electronic program guide (EPG) information about a broadcast program or content attribute information from a broadcasting station, together with the content or separately from the content. The EPG information may refer to a broadcast program guide service including a title of a broadcast program, a broadcast time and content, and cast information. The content attribute information may be information indicating a topic of the content or the subject of the content. The content attribute information may be information separate from the EPG information, may be included in the EPG information, or may be information partially overlapping the EPG information.

In an embodiment of the disclosure, the chat information acquisition unit 420 may obtain chat information from at least one of a title of a chat room 402 or chat message content output on the screen.

In an embodiment of the disclosure, the chat information acquisition unit 420 may obtain chat information by extracting meaningful information from the title and text of the chat message based on machine learning, statistical natural language processing, or deep learning. In an embodiment of the disclosure, the chat information acquisition unit 420 may analyze a grammatical construction or syntax of a sentence, and may identify the actual meaning of the sentence.

In an embodiment of the disclosure, the situation information acquisition unit 211 may obtain situation information including at least one of the content information obtained by the content information acquisition unit 410 or the chat information obtained by the chat information acquisition unit 420. In an embodiment of the disclosure, the situation information acquisition unit 211 may transmit the situation information to the voice recognizer selection unit 213.

Figure 5:
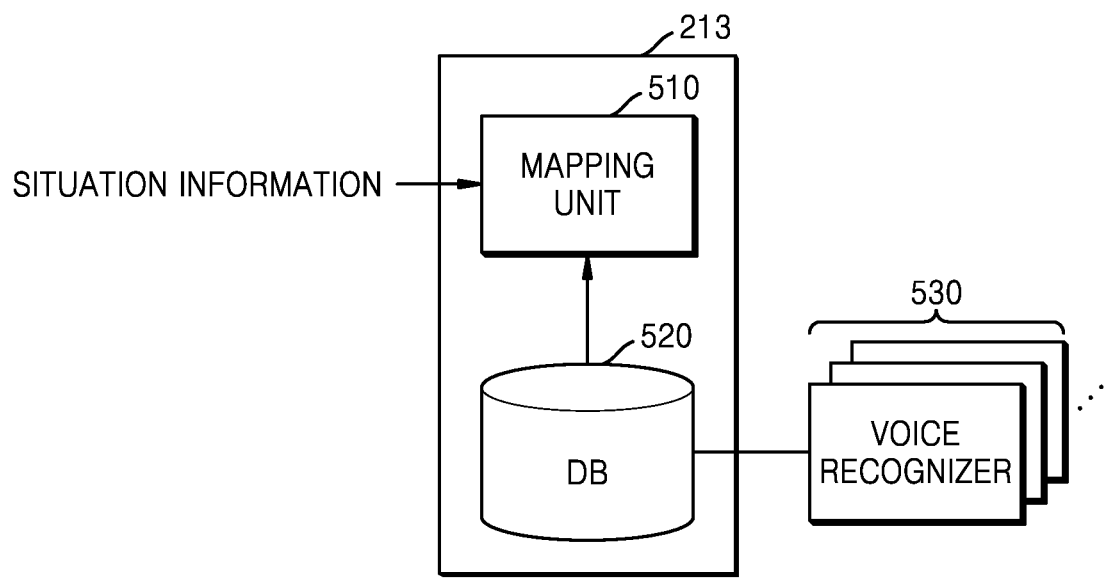
FIG. 5 is a block diagram illustrating an example configuration of a voice recognizer selection unit included in the processor of FIG. 3, according to various embodiments.

FIG. 5 is a block diagram illustrating an example configuration of a voice recognizer selection unit included in a processer or of FIG. 3, according to various embodiments.

Referring to FIG. 5, the voice recognizer selection unit 213 may include a mapping unit (e.g., including various processing circuitry and/or executable program instructions) 510 and a database (DB) 520. Although not included in the voice recognizer selection unit 213, a plurality of voice recognizers 530 may be included in the display apparatus 200.

In an embodiment of the disclosure, label information for identifying the voice recognizer 530 may be stored as data in the DB 520. The label information may include a kind of tag and may be an identifier that classifies information, displays a boundary, or displays an attribute or identity of information. The label information may be in the form of words, an image, or other identification marks.

In an embodiment of the disclosure, the voice recognizer 530 may be identified by one or more label information indicating a type or a category of training data used to train a learning model included in the voice recognizer 530. The label information may be assigned to the voice recognizer 530 to manage or search for the voice recognizer 530.

In an embodiment of the disclosure, the mapping unit 510 may search for label information corresponding to situation information in the DB 520. In an embodiment of the disclosure, the label information corresponding to the situation information may refer to label information in which a similarity with the situation information is equal to or greater than a reference value.

In an embodiment of the disclosure, the mapping unit 510 may select a voice recognizer identified by label information corresponding to situation information. For example, when the label information mapped to the situation information is label 1, label 3, and label N, the mapping unit 510 may select voice recognizers identified by the label 1, the label 3, and the label N. In this case, the voice recognizer identified by the label 1, the voice recognizer identified by the label 3, and the voice recognizer identified by the label N may be different voice recognizers or the same one voice recognizer. Alternatively, the voice recognizer identified by the label 1 and the voice recognizer identified by the label 3 may be the same voice recognizer, and the voice recognizer identified by the label N may be a different voice recognizer.

In an embodiment of the disclosure, the mapping unit 510 may identify a voice recognizer identified by label information corresponding to situation information, and may notify the voice recognizer to the voice recognition unit 215.

Although the DB 520 is included in the voice recognizer selection unit 213 in FIG. 5, this is merely an example, and the DB 520 storing label information may be stored in a server outside the display apparatus 200, not stored in the display apparatus 200. In this case, the voice recognizer 530 may also be stored in the external server, not stored in the display apparatus 200. When the DB 520 is stored in the external server, the mapping unit 510 may transmit situation information to the external server through a communication unit (not shown). The external server may search for and select a voice recognizer mapped to the situation information in the DB 520, and may transmit a result obtained by performing voice recognition with the selected voice recognizer to the display apparatus 200.

Figure 6:
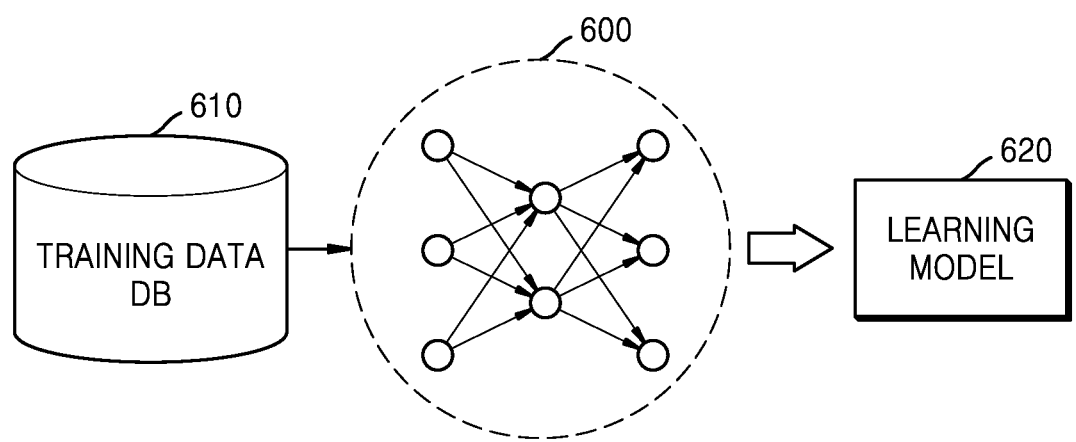
FIG. 6 is a diagram illustrating that a learning model included in a voice recognizer is differently generated according to a type of input data, according to various embodiments.

FIG. 6 is a diagram illustrating a learning model included in a voice recognizer is differently generated according to a type of input data, according to various embodiments.

Referring to FIG. 6, a neural network 600 may obtain training data from a training data DB 610. The neural network 600 may be trained to classify data input using training data as an input value, analyze the input data, extract features of the training data, and infer a voice recognition result corresponding to a voice signal from the features of the training data.

When a plurality of training data are input, the neural network 600 may be trained on a method of recognizing a voice from the plurality of training data, and may generate a learning model 620 based on a trained result. The learning model 620 may be a trained neural network itself, which enables a desired result to be obtained through the neural network 600.

In an embodiment of the disclosure, performance of a voice recognizer may vary according to a type of data with which a learning model included in the voice recognizer is trained. That is, because a different learning model 620 is generated according to a type of training data used by the neural network 600 for training, even when the learning model 620 performs voice recognition on the same voice signal, performance or a result of voice recognition recognized by the learning model 620 may vary according to a type of training data.

In an embodiment of the disclosure, training data belonging to various categories or domains may be stored in the training data DB 610.

In an embodiment of the disclosure, the neural network 600 may be trained using a spoken language in one of various languages. In an embodiment of the disclosure, a type of training data used by the neural network 600 for training may vary according to a language of training data included in the training data DB 610, and thus, the learning model 620 by language may be generated. For example, the training data DB 610 may include a spoken language such as a daily language or a written language in any one of various languages such as Korean, English, French, Italian, Chinese, or Japanese. The daily language may refer to a spoken language that is commonly used in everyday conversation, and the written language may refer to a literary or written language. The neural network 600 may obtain a collection of text or a corpus for each language from the training data DB 610, may analyze an input spoken language using the corpus as an input value, and may generate the learning model 620 in the corresponding language.

In an embodiment of the disclosure, the neural network 600 may be trained on information about one or more of various fields. For example, the training data DB 610 may include training data including information about at least one of various fields such as humanities, politics, economics, finance, social studies, biology, physics, geography, chemistry, entertainment, art, music, or sports. In an embodiment of the disclosure, the neural network 600 may generate the learning model 620 that is trained, according to a field of training data used for training, on information about the field. Because vocabulary or terms frequently used in a field are different for each field of training data and the same term may be used with different meanings, when a model for each field is generated using training data for each field, vocabulary or terms belonging to a specific field may be more accurately analyzed.

In an embodiment of the disclosure, the neural network 600 may be trained on information about one of various genres. For example, the training data DB 610 may include training data including information about one of various genres such as news, talk, drama, comic, entertainment, documentary, sports, infant programs, youth programs, or adult content. The neural network 600 may generate the learning model 620 that is trained, according to a genre of training data used for training, on information about the genre.

In an embodiment of the disclosure, the neural network 600 may be trained on information about a specific broadcasting station from among a plurality of broadcasting stations. The neural network 600 may be trained on information about a specific channel from among a plurality of broadcast channels. For example, when a broadcasting station is a broadcasting station specialized in producing a specific program or a channel is a channel that broadcasts a specific type of program, the neural network 600 may be trained on information about the broadcasting station or information about the channel, to be trained on a similar genre or type of broadcast program produced by the broadcasting station or a similar type of program broadcast through the channel.

Likewise, the neural network 600 may be trained on information about any one of various program types. Program types may be divided into short shows or series of episodes.

Likewise, the neural network 600 may be trained on information about a program produced by a specific producer or production company from among a plurality of producers or production companies.

Likewise, the neural network 600 may be trained on information about a program in which a specific cast member appears from among a plurality of cast members. In this case, the neural network 600 may be trained on a tone or a way of talking of the specific cast member. Also, the neural network 600 may be trained on information about a program supervised by a specific director from among a plurality of directors. In this case, the neural network 600 may be trained on a style, preference, or atmosphere of the specific director.

The neural network 600 may be trained on information about a specific region. The information about the specific region may include a spoken language frequently used in the specific region, manners and customs of the region, and tourist attractions of the region. Because a tone, a way of speaking, intonation, and vocabulary showing regional color is likely to be used for each region, when a regional model is generated using the information about the specific region, a voice signal of a tone belonging to the specific region may be more accurately analyzed.

The neural network 600 may be trained with personalized training data obtained based on user information, In an embodiment of the disclosure, the user information may include at least one of profile information of a user, viewing history information of the user, or chat message content information input by the user. The profile information of the user that is information for identifying the user may be obtained based on an account of the user. The profile information of the user may include the user's gender, age, marital status, children, number of family members, occupation, and anniversary such as birthday. The neural network 600 may be trained using profile information input when the user generates an account, viewing history information of the user, and chat message content input by the user as training data. The neural network 600 may generate a user-customized learning model, by inferring information about a type or genre of a program or content preferred by the user, a preferred broadcasting station or preferred channel, and preferred content based on the user information.

The neural network 600 may be trained with training data of a group obtained based on information about a group to which the user belongs. The information about the group to which the user belongs may refer to information related to people whose user information overlaps the user by a reference value or more. The information about the group to which the user belongs may include at least one of profile information, viewing history information, or chat message content information of the people whose user information overlaps the user. For example, when the user is a woman in her 30s, is single, and lives in Seoul, and a program she frequently watches is a program related to pets, the neural network 600 may be trained, for people who are in their 30s, are single, live in Seoul, and frequently watch pet-related content, on programs frequently watched by the people and chat content input by the people.

The learning model 620 may be a trained neural network itself, which enables a desired result to be obtained through the neural network 600. For example, by training the neural network 600 with training data such as various languages, fields, program types, genres, broadcasting stations, channels, producers, casts, directors, regions, user information, and user group information, a plurality of weights respectively applied to a plurality of nodes of the neural network 600 may be set. The weight may refer to a connection strength between the nodes of the neural network 600. The weight may be optimized through repeated training, and may be repeatedly modified until the accuracy of a result satisfies a certain reliability level. For example, the weight may be continuously modified until a voice recognition result output from the neural network 600 is equal to or greater than an answer set by a reference value or more.

The learning model 620 may be a neural network formed by finally set weights.

In an embodiment of the disclosure, an operation of training with training data of a specific field or genre using one or more neural networks 600 may be performed in advance.

An operation of training a method of detecting a voice recognition result from the training data using one or more neural networks 600 may be performed in the display apparatus 200, but is not limited thereto and may be performed in an external computing device combined with the display apparatus 200 through a communication network. An operation of training a method of performing voice recognition by training with training data using one or more neural networks 600 may require a relatively complex computation amount. In this case, when an external computing device separate from the display apparatus 200 performs a training operation and the display apparatus 200 receives the learning model 620 from the external computing device, a computation amount to be performed by the display apparatus 200 may be reduced. The display apparatus 200 may receive the learning model 620 from an external server, may store the learning model 620 in the memory 220 or the processor 210, and may perform voice recognition on a voice signal using the stored learning model 620.

Even after the learning model 620 whose training ends is mounted in the display apparatus 200, according to situation information or the user's voice signal, or when some of training data is changed, the learning model 620 may be updated. When necessary, new training data may be used at certain intervals. When new training data is added, one or more neural networks 600 may be trained again on a method of obtaining a voice recognition result from the training data, and thus, a learning model may be updated.

Figure 7:
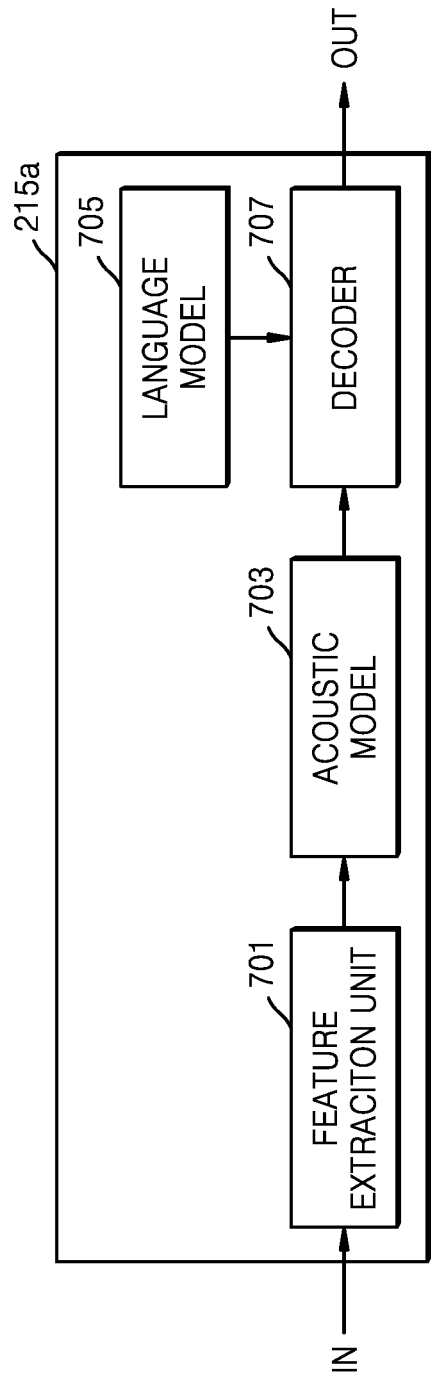
FIG. 7 is a block diagram illustrating an example configuration of a voice recognition unit included in the processor of FIG. 3, according to various embodiments.

FIG. 7 is a block diagram illustrating an example configuration of a voice recognition unit included in a processor of FIG. 3, according to various embodiments.

A voice recognition unit 215*a* of FIG. 7 may be an example of the voice recognition unit 215 of FIG. 3.

The voice recognition unit 215*a* may perform speech-to-text (STT) processing that recognizes and interprets a language spoken by a person and converts content into text data of the language.

Referring to FIG. 7, the voice recognition unit 215*a* may include a feature extraction unit 701, an acoustic model 703, a language model 705, and a decoder 707. As noted above, each of these units may include various processing circuitry and/or executable program instructions.

The feature extraction unit 701 may detect an actual voice section included in an input voice by performing end point detection (EPD) on a voice signal transmitted from a microphone (not shown), and may extract a feature vector of the input voice in the detected section. The feature extraction unit 701 may extract a feature vector of an input voice by applying feature vector extraction technology such as cepstrum, linear predictive coefficient (LPC), mel-frequency cepstral coefficient (MFCC), or filter bank energy in the detected section.

The acoustic model 703 may include a model of modeling and comparing signal characteristics of a voice may use a direct comparison method of setting a recognition target as a feature vector model and comparing the feature vector model with a feature vector of voice data or may use a statistical method of statically processing and using a feature vector of a recognition target. The direct comparison method may include a method of setting a unit such as a word or a phoneme provided as a recognition target to a feature vector model and comparing an input voice with the feature vector model includes, for example, a vector quantization method. In the vector quantization method, a feature vector of input voice data is mapped to a codebook that is a reference model and encoded into a representative value, and code values are compared with each other. The statistical model method is a method of configuring a unit for a recognition target as a state sequence and using a relationship between state sequences, and the state sequence may include a plurality of nodes. A method of using a relationship between state sequences includes a method of using dynamic time warping (DTW), a hidden Markov model (HMM), or an artificial neural network (ANN).

The language model 705 is a model that is statistically trained on a gramma system for usability problems of a corresponding language such as vocabulary selection or a sentence-level syntax structure. The language model 705 is a model of modeling a linguistic order relation of words or syllables, and may reduce acoustic ambiguity and recognition errors by applying an order relation between units of a language to units obtained in voice recognition. The language model 705 includes a statistical language model and a model based on finite state automata (FSA), and in the statistical language model, a chain probability of words such as unigram, bigram, or trigram may be used.

The decoder 707 may output text information from a voice signal using prior knowledge of language data and a voice. The decoder 707 may finally determine a word sequence by comparing and scoring an input feature vector with a model using the acoustic model 703 and the language model 705. The decoder 707 may obtain text-type words or sentence as a voice recognition result. Also, the decoder 707 may output a probability value of obtaining a voice recognition result along with text. For example, when two voice recognition results A and B are obtained for a voice signal, the decoder 707 may derive a probability that the voice signal is A and a probability that the voice signal is B. In an embodiment of the disclosure, the decoder 707 may transmit only a voice recognition result obtained with a highest probability from among voice recognition results obtained from one voice recognizer to the voice recognition result output unit 217.

The voice recognition unit 215*a* of FIG. 7 may be included in one voice recognizer.

In an embodiment of the disclosure, the display apparatus 200 may include a plurality of voice recognizers. That is, the display apparatus 200 may include a plurality of voice recognizers 215*a* of FIG. 7.

In an embodiment of the disclosure, each of the plurality of voice recognizers may include an acoustic model and a language model trained with various training data for domains or categories as described with reference to FIG. 6. Also, the voice recognizer may be labeled according to a type of training data with which the acoustic model and the language model are trained.

In an embodiment of the disclosure, the voice recognition unit 215a may improve voice recognition performance, by updating an existing learning model whenever the voice recognition unit 215a newly receives a user's voice signal.

However, a voice recognizer that performs STT, used in the application, is not limited to the voice recognition unit 215a of FIG. 7. For example, the display apparatus 200 may obtain a voice recognition result from a voice signal using an AI model that integrally performs functions of modules included in the voice recognition unit 215a, based on deep learning technology. For example, the voice recognizer may perform voice recognition based on a sequence-to-sequence recurrent neural network (RNN), or may perform voice recognition using a single function that inputs a series of audio features and outputs a series of characters or words using an end-to-end training method.

In this case, an AI model used to obtain a voice recognition result from a voice signal may be trained in advance with various types of training data according to various fields such as domains or categories, as described with reference to FIG. 6. Also, a model included in the voice recognizer may be newly trained and updated with a new voice signal whenever a new voice signal is input.

Figure 8A:
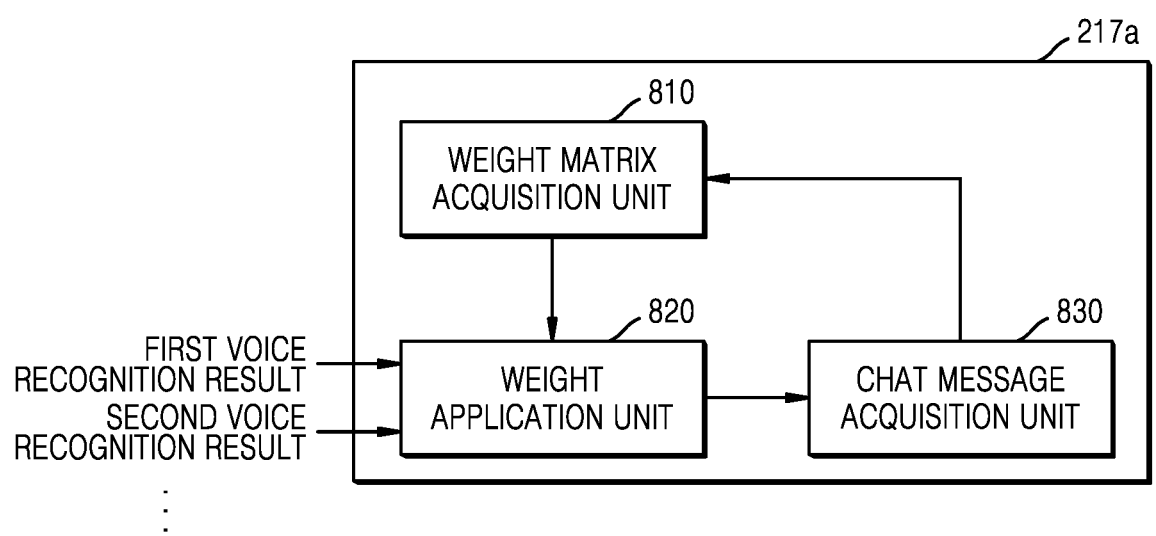
FIGS. 8A and 8B are block diagrams illustrating an example configuration of a voice recognition result output unit of FIG. 3, according to various embodiments.
Figure 8B:
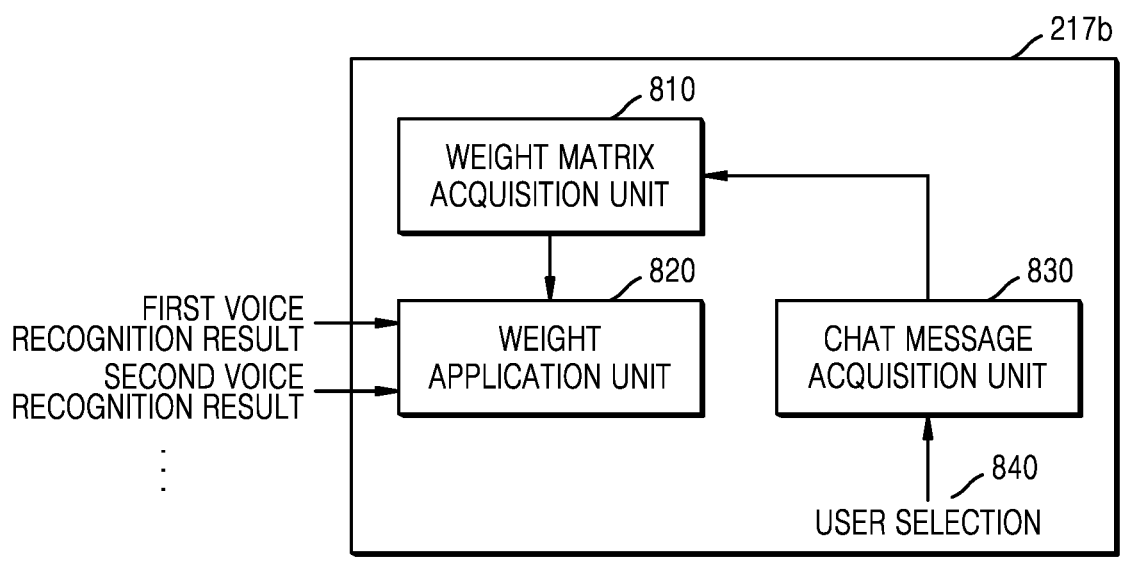

FIGS. 8A and 8B are internal block diagrams illustrating example configurations of a voice recognition result output unit of FIG. 3, according to various embodiments.

A voice recognition result output unit 217a of FIG. 8A is an example of the voice recognition result output unit 217 of FIG. 3, and a chat message acquisition unit 830 outputs one chat message.

Referring to FIG. 8A, the voice recognition result output unit 217a may include a weight matrix acquisition unit 810, a weight application unit 820, and the chat message acquisition unit 830. As noted above, each of these units may include various processing circuitry and/or executable program instructions.

In an embodiment of the disclosure, the weight matrix acquisition unit 810 may obtain a weight matrix. In an embodiment of the disclosure, the weight matrix may be a matrix including a weight of each of a plurality of voice recognizers as a vector. In an embodiment of the disclosure, the weight may indicate a degree to which a voice recognizer is selected or a user reference for each voice recognizer. For example, the weight may indicate a user's reliability in a voice recognition result of the voice recognizer or the accuracy of the voice recognition result. The weight included in the weight matrix is different from a weight indicating a connection strength nodes of the neural network 600 described with reference to FIG. 6.

In an embodiment of the disclosure, the weight matrix may be pre-stored in the display apparatus 200. In a state where weights of the plurality of voice recognizers are set as initial values, the weight matrix may be stored as a table in the display apparatus 200. The initial weights of the plurality of voice recognizers may be set to the same value. A weight of each recognizer may be changed according to a degree to which the user selects a voice recognition result.

In an embodiment of the disclosure, the weight application unit 820 may receive a voice recognition result from the voice recognition unit 215. The voice recognition result may include text such as words or a sentence and a probability value of the voice recognition result.

When the voice recognition unit 215 obtains a plurality of voice recognition results for a voice signal of the user using a plurality of voice recognizers, the weight application unit 820 may obtain the plurality of voice recognition results from the voice recognition unit 215. For example, when the voice recognition unit 215 performs voice recognition using a first voice recognizer and a second voice recognizer from among a plurality of voice recognizers and obtains a first voice recognition result with the first voice recognizer and obtains a second voice recognition result with the second voice recognizer, the voice recognition unit 215 may transmit the first voice recognition result and the second voice recognition result to the weight application unit 820. The first voice recognition result may include first text and a first probability value for the first text, and the second voice recognition result may include second text and a second probability value for the second text.

In an embodiment of the disclosure, the weight application unit 820 may receive the weight matrix from the weight matrix acquisition unit 810, and may apply the weight matrix to each probability value. For example, the weight application unit 820 may multiply the first probability value by a weight of the first voice recognizer, and may multiply the second probability value by a weight of the second voice recognizer. The weight application unit 820 may transmit a value obtained by multiplying the probability value by the weight to the chat message acquisition unit 830.

In an embodiment of the disclosure, the chat message acquisition unit 830 may receive a value obtained by multiplying the probability value by the weight from the weight application unit 820 and may select a voice recognition result to be output on a screen from among a plurality of voice recognition results.

In an embodiment of the disclosure, the chat message acquisition unit 830 may select text in which a result obtained by multiplying the weight by the probability value is equal to or greater than a reference value as a chat message to be output through the screen. In the above example, when each of a first result value obtained by multiplying the first probability value by the weight of the first voice recognizer and a second result value obtained by multiplying the second probability value by the weight of the second voice recognizer is equal to or greater than a reference value, the chat message acquisition unit 830 may select text having a higher value as a result of multiplying the probability value by the weight as a chat message.

In an embodiment of the disclosure, the chat message acquisition unit 830 may output the selected chat message through the screen.

In an embodiment of the disclosure, the weight matrix acquisition unit 810 may receive information about a voice recognizer by which the chat message output from the chat message acquisition unit 830 is recognized, and may update the weight matrix. The weight matrix acquisition unit 810 may update the weight matrix, by assigning a high weight to the voice recognizer that derives the chat message finally output on the screen.

A voice recognition result output unit 217b of FIG. 8B has the same or similar function as the voice recognition result output unit 217a of FIG. 8A except that when a plurality chat messages are output on a screen, a user selection 840 is additionally received.

In FIG. 8B, when the first result value obtained by multiplying the first probability value by the weight of the first voice recognizer and the second result value obtained by multiplying the second probability value by the weight of the second voice recognizer are each equal to or greater than a reference value and are each within a certain error range, the chat message acquisition unit 830 included in the voice recognition result output unit 217b may output chat messages for all voice recognition results having result values included in the certain error range. For example, when the difference between the first result value and the second result value is within an error range of 10%, the chat message acquisition unit 830 may select both first text and second text as chat messages to be output on the screen. The chat message acquisition unit 830 may output both the chat message of the first text and the chat message of the second text through the screen.

In an embodiment of the disclosure, the user may select one chat message to be transmitted to a chat room from among a plurality of chat messages output on the screen, through a user input unit (not shown). The display apparatus 200 may transmit one chat message selected by the user to a server, to display the chat message selected by the user in the chat room.

In an embodiment of the disclosure, the weight matrix acquisition unit 810 may receive information about voice recognizers by which chat messages output from the chat message acquisition unit 830 are recognized, and may update the weight matrix. Also, the weight matrix acquisition unit 810 may receive information about a voice recognizer by which a chat message selected by the user is recognized from among the chat messages output from the chat message acquisition unit 830, and may update the weight matrix. The weight matrix acquisition unit 810 may update the weight matrix by adjusting a weight for the voice recognizer by reflecting a selection result of the user.

Figure 9:
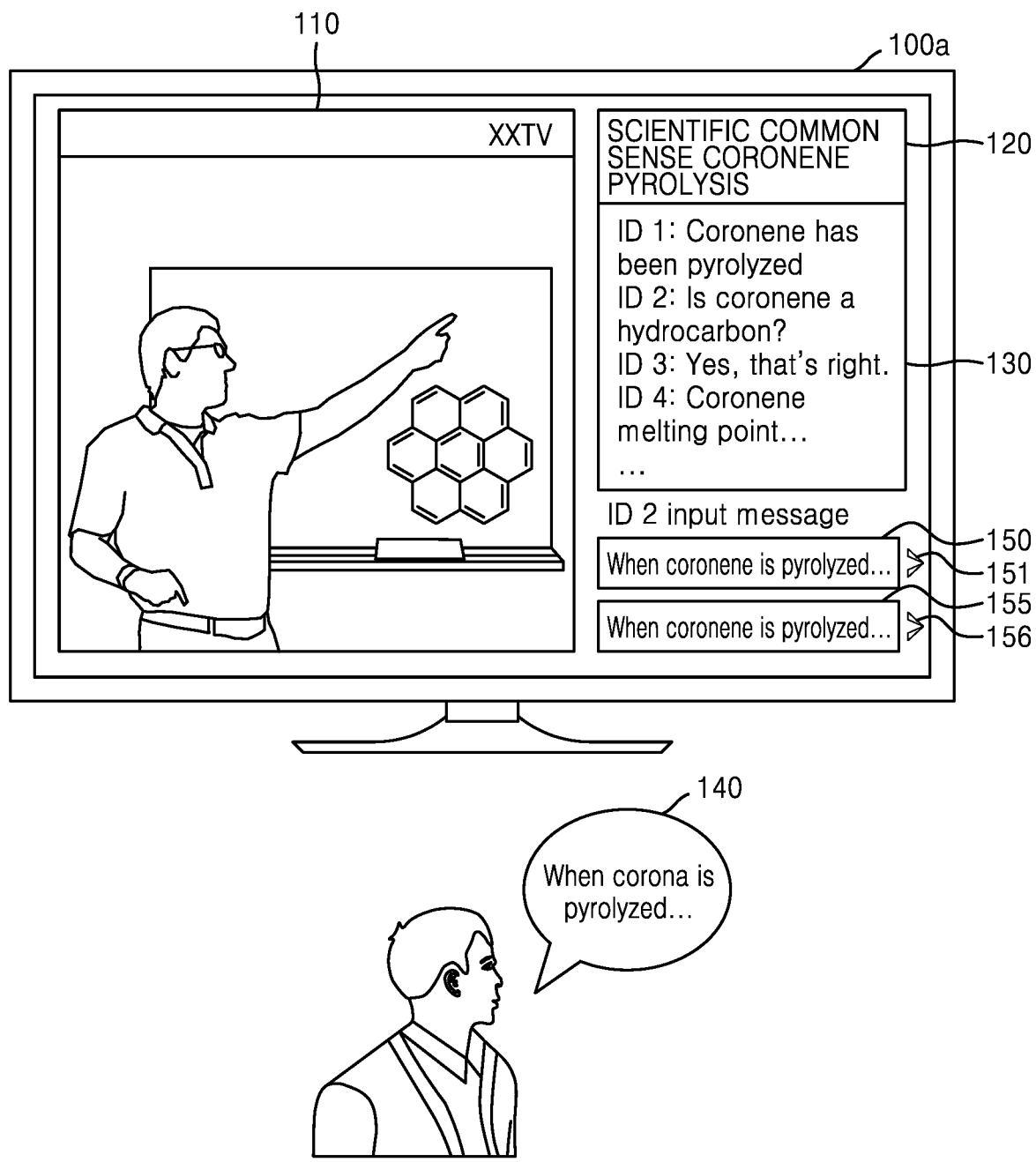
FIG. 9 is a diagram illustrating a display apparatus outputting a plurality of chat messages from a user's voice signal on a screen, according to various embodiments.

FIG. 9 is a diagram illustrating an example display apparatus outputting a plurality of chat messages from a user's voice signal on a screen, according to various embodiments.

A display apparatus 100a of FIG. 9 has the same or similar function as the display apparatus 100 of FIG. 1 except that a plurality of chat messages are output on a screen, and thus a repeated description may not be provided here.

Referring to FIG. 9, the display apparatus 100a may output content 110 through a screen. The display apparatus 100a may output a title 120 of a chat room and a chat message 130 on the screen. The display apparatus 100a may obtain situation information including at least one of content information about the content 110 or chat information related to chatting, and may select at least one of a plurality of voice recognizers using a label of a voice recognizer and the situation information.

As in FIG. 1, when a user inputs a chat message using a voice signal, it is assumed that the user intends to utter 'when coronene is pyrolyzed' but incorrectly utters 'when corona is pyrolyzed'.

In an embodiment of the disclosure, the display apparatus 100a may obtain a plurality of voice recognition results with probability values using the plurality of voice recognizers, and may apply a weight matrix to a probability value of each voice recognition result.

In an embodiment of the disclosure, the display apparatus 100a may obtain, as a chat message, text according to a voice recognition result recognized with a probability value that is equal to or greater than a reference value from among weighted probability values.

In an embodiment of the disclosure, when there are a plurality of voice recognition results in which a value obtained by multiplying a weight by a probability value is equal to or greater than a reference value, the display apparatus 100a may output chat messages corresponding to all of the plurality of voice recognition results on the screen. For example, when three voice recognition results are obtained from a plurality of voice recognizers included in the display apparatus 100a and there are two voice recognition results in which a value obtained by multiplying a probability value of a voice recognition result by a weight is equal to or greater than a reference, the display apparatus 100a may select chat messages corresponding to both the two voice recognition results.

In an embodiment of the disclosure, when there are a plurality of voice recognition results in which a value obtained by multiplying a weight by a probability value is equal to or greater than a reference value and the number of the plurality of voice recognition results is greater than a pre-determined number, the display apparatus 100a may cause the pre-determined number of chat messages to be output on the screen in the order of having a higher result value from among the result values. For example, when the display apparatus 100a obtains four voice recognition results and there are three voice recognition results in which a value obtained by multiplying a probability value of a voice recognition result by a weight is equal to or greater than a reference value, the display apparatus 100a may cause only a pre-determined number of, that is, two, chat messages to be output on the screen in the order of having a higher result value.

In an embodiment of the disclosure, the display apparatus 100a may respectively output the two chat messages to a first chat message input box 150 and a second chat message input box 155 as shown in FIG. 9.

The user may select a chat message matching the user's intention from among a plurality of chat messages output on the screen. The user may select one of the plurality of chat messages using a voice signal such as 'upper one' or 'lower one', or may select a chat message by selecting one of check marks 151 and 156 next to the first and second chat message input boxes 150 and 155 by manipulating a keyboard or a mouse.

In an embodiment of the disclosure, the display apparatus 100a may transmit a chat message selected by the user from among the plurality of chat messages to a chat server.

In an embodiment of the disclosure, the display apparatus 100a may update a weight matrix based on selection history of the user. That is, the display apparatus 100a may update the weight matrix by, according to a chat message selected by the user from among the plurality of chat messages, assigning a high weight to a voice recognizer that derives a voice recognition result corresponding to the chat message selected by the user and assigning a low weight to a voice recognizer that derives a voice recognition result corresponding to a chat message not selected by the user.

Figure 10:
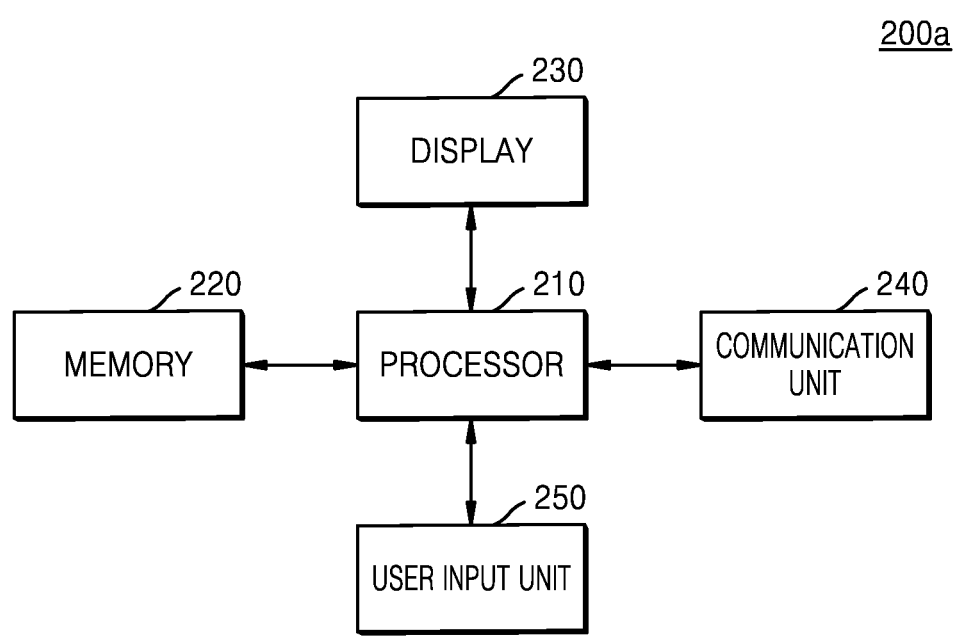
FIG. 10 is a block diagram illustrating an example configuration of a display apparatus, according to various embodiments.

FIG. 10 is a block diagram illustrating an example configuration of a display apparatus, according to various embodiments.

A display apparatus 200a of FIG. 10 may be an example of the display apparatus 200 of FIG. 2.

Referring to FIG. 10, the display apparatus 200a may include the processor (e.g., including processing circuitry) 210, the memory 220, a display 230, a communication unit (e.g., including communication circuitry) 240, and a user input unit (e.g., including input circuitry) 250.

In an embodiment of the disclosure, the display apparatus 200a may be an image display apparatus. The image display apparatus may be a digital TV capable of receiving a digital broadcast, but is not limited thereto and may be any of various types of electronic devices. For example, the display apparatus 200a may be a mobile terminal such as a smartphone. The display apparatus 200a may output broadcast content, a chat room opened in relation to the broadcast content, and a chat message on a screen.

In an embodiment of the disclosure, the display apparatus 200a may receive items such as various movies or dramas through video-on-demand (VOD) services or television programs from content providers.

In an embodiment of the disclosure, the display apparatus 200a may receive broadcast content data transmitted by a broadcast content server through a source device. The source device may include, but is not limited to, a set-top box and a terrestrial receiver.

In an embodiment of the disclosure, the display apparatus 200a may receive a title of a chat room and a chat message from a server that provides a chat service.

In an embodiment of the disclosure, the broadcast content server and the server that provides the chat server may be the same server or separate servers.

In an embodiment of the disclosure, the display 230 may output broadcast content received in real time.

The display 230 may include, for example, and without limitation, at least one of a liquid crystal display, a thin-film transistor-liquid crystal display, an organic light-emitting diode, a flexible display, a three-dimensional (3D) display, an electrophoretic display, or the like. According to an implementation type of the display 230, two or more displays 230 may be provided. When the display 230 is implemented as a touch screen, the display 230 may be used as an input device such as a user interface in addition to an output device.

In an embodiment of the disclosure, the display 230 may display content and a chat room that provides a chat service for the content together on one screen. The chat room may refer to an area where a program for chatting is executed on all or part of the screen of the display apparatus 200a.

In an embodiment of the disclosure, the display 230 may output a plurality of chat messages transmitted by a server in the chat room.

In an embodiment of the disclosure, the display 230 may output a chat message input by a user through the user input unit 250, on a user message input part.

In an embodiment of the disclosure, the user input unit 250 may include various input circuitry to receive a user input for controlling the display apparatus 200a. The input unit 250 may include any of various input devices including, but not limited to, a touch panel for detecting a touch of the user, a button for receiving a push operation of the user, a wheel for receiving a rotation operation of the user, a keyboard, a dome switch, a microphone for voice recognition, and a motion detection sensor for sensing a motion.

In an embodiment of the disclosure, the user input unit 250 may receive a chat message from the user. In an embodiment of the disclosure, the user input unit 250 may receive a chat message as a voice signal through a microphone.

In an embodiment of the disclosure, the user input unit 250 may receive information about a user account. The information about the user account that is information for proving the user's identity may include various types of information such as characters or numbers, symbols, or biometric information for identifying or authenticating the user such as the user's ID and password, pattern, fingerprint, or iris.

In an embodiment of the disclosure, the communication unit 240 may include various communication circuitry and connect the display apparatus 200a to a peripheral device, an external device, a server, or a mobile terminal under the control of the processor 210. The communication unit 240 may connect the display apparatus 200a to an external device or a server, using a wired or wireless communication network. The communication unit 240 may include at least one communication module capable of performing wireless communication. In an embodiment of the disclosure, the communication unit 240 may be connected to a server that provides a chat service.

The display apparatus 200a may download a program or an application required by the display apparatus 200a from the external device or the server or may perform web browsing through the communication unit 240.

The communication unit 240 may receive a control signal through a control apparatus (not shown) such as a remote controller under the control of the processor 210. The control signal may be implemented as a Bluetooth type, an RF signal type, or a Wi-Fi type.

In an embodiment of the disclosure, the communication unit 240 may transmit a chat message input through the user input unit 250 to the server, and may receive a response to the chat message from the server.

In an embodiment of the disclosure, the communication unit 240 may receive information about a chat room and chat messages generated by a plurality of clients from the server.

The memory 220 according to an embodiment of the disclosure may store one or more instructions. The memory 220 may store at least one program executed by the processor 210. The memory 220 may store a pre-defined operation rule or program. Also, the memory 220 may store data input to the display apparatus 200a or output from the display apparatus 200a.

The processor 210 may include various processing circuitry and controls an overall operation of the display apparatus 200a. The processor 210 may control the display apparatus 200a to function by executing one or more instructions stored in the memory 220.

In an embodiment of the disclosure, the processor 210 may be connected to at least one of a broadcast content server or a server that provides a chat service based on a user account. The processor 210 may transmit the user account to a server to request the server for a chat service, and may receive a chat room and chat messages from the server. However, this is not essential, and when necessary, the server may not require a user account, and may transmit a chat room and chat messages to the connected display apparatus 200a without a user account.

In an embodiment of the disclosure, the processor 210 may obtain situation information for voice recognizer selection, and may select at least one of a plurality of voice recognizers based on the situation information.

In an embodiment of the disclosure, the processor 210 may obtain a voice recognition result from the user's voice signal, using the selected at least one voice recognizer.

In an embodiment of the disclosure, the processor 210 may obtain a chat message from the voice recognition result.

Figure 11:
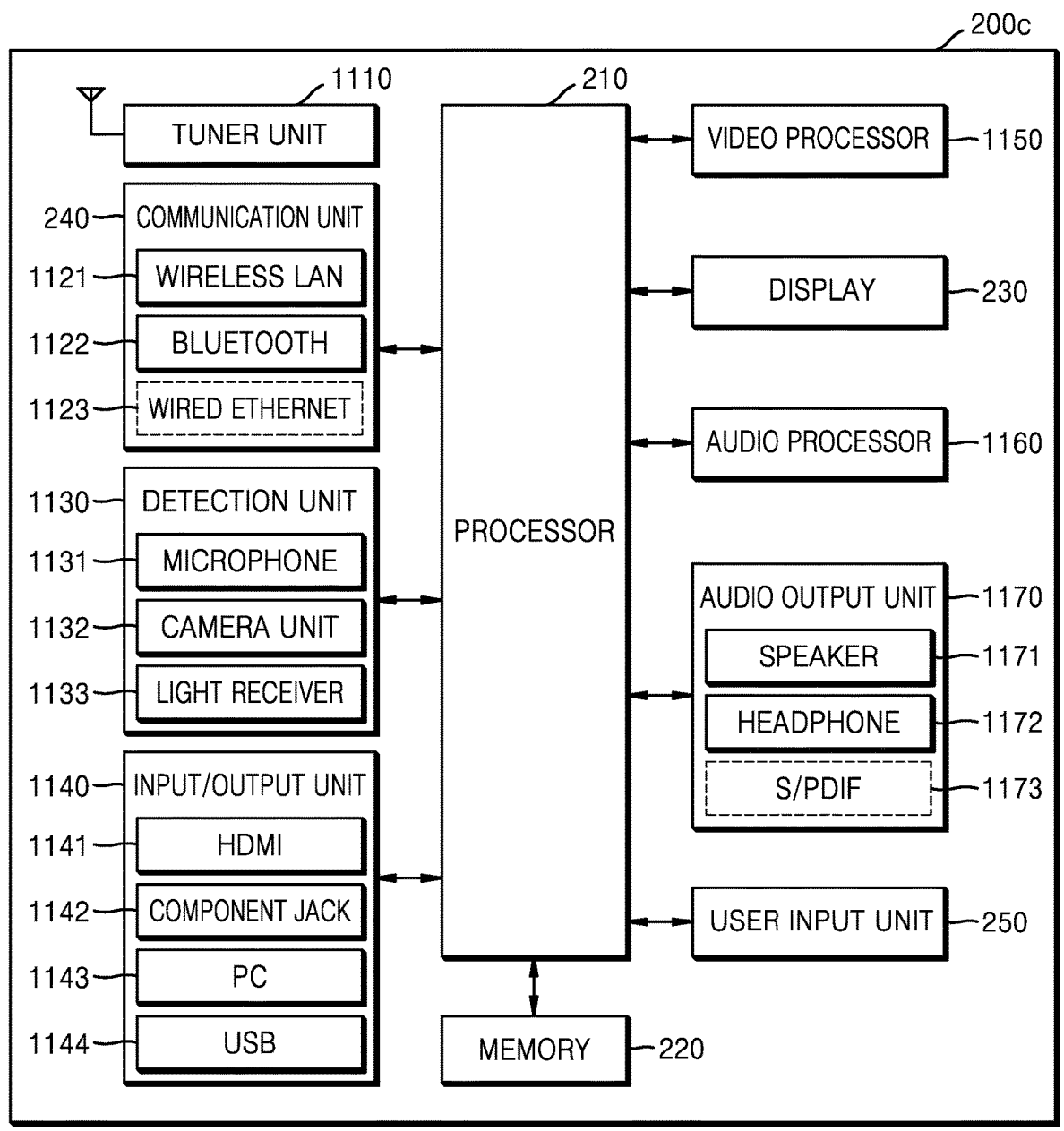
FIG. 11 is a block diagram illustrating an example configuration of a display apparatus, according to various embodiments.

FIG. 11 is a block diagram illustrating an example configuration of a display apparatus, according to various embodiments.

A display apparatus 200c of FIG. 11 may be an example of the display apparatus 200a of FIG. 10. The same description as that made with reference to FIG. 10 may not be repeated.

Referring to FIG. 11, the display apparatus 200c may further include a tuner unit (e.g., including a tuner) 1110, a detection unit (e.g., including detecting circuitry) 1130, an input/output unit (e.g., including input/output circuitry) 1140, a video processor (e.g., including video processing circuitry) 1150, an audio processor (e.g., including audio processing circuitry) 1160, and an audio output unit (e.g., including audio output circuitry) 1170, in addition to the processor (e.g., including processing circuitry) 210, the memory 220, the communication unit (e.g., including communication circuitry) 240, the display 230, and the user input unit (e.g., including input circuitry) 250.

The tuner unit 1110 may include a tuner and tune and select only a frequency of a channel to be received by the display apparatus 200c from among a plurality of wave components by performing amplification, mixing, and resonance on broadcast content that is received by wire or wirelessly. Content received through the tuner unit 1110 is decoded into an audio, a video, and/or additional information. The audio, the video, and/or the additional information may be stored in the memory 220 under the control of the processor 210.

The communication unit 240 may include various communication circuitry and connect display apparatus 200c to a peripheral device, an external device, a server, or a mobile terminal under the control of the processor 210. The communication unit 240 may include at least one communication module capable of performing wireless communication. The communication unit 240 may include at least one of a wireless local area network (LAN) module 1121, a Bluetooth module 1122, or a wired Ethernet 1123 corresponding to the performance and structure of the display apparatus 200c.

The Bluetooth module 112 may receive a Bluetooth signal transmitted from a peripheral device according to a Bluetooth communication standard. The Bluetooth module 11202 may be a Bluetooth low energy (BLE) communication module, and may receive a BLE signal. The Bluetooth module 112 may constantly or temporarily scan a BLE signal in order to detect whether a BLE signal is received. The wireless LAN module 1121 may transmit and receive a Wi-Fi signal with a peripheral device according to a Wi-Fi communication standard.

In an embodiment of the disclosure, the communication unit 240 may transmit a chat message input through the user input unit 250 to a server using a communication module, and may receive a chat message from the chat server.

In an embodiment of the disclosure, the communication unit 240 may receive information about a chat room and chat messages generated by a plurality of clients from the server.

The detection unit 1130 may include various detection circuitry and detect a user's voice, image, or interaction, and may include a microphone 1131, a camera unit 1132, a light receiver 1133, and a sensing unit 1134. The microphone 1131 may receive an audio signal including the user's uttered voice or noise, may convert the received audio signal into an electrical signal, and may output the electrical signal to the processor 210.

The microphone 1131 included in the detection unit 1130 of FIG. 11 may operate as the user input unit 250. That is, the microphone 1131 may detect a voice signal of the user, and may notify the voice signal to the processor 210, so that the processor 210 performs a voice recognition operation on the voice signal of the user.

The camera unit 1132 may include a sensor (not shown) and a lens (not shown), may capture an image formed on a screen, and may transmit the image to the processor 210.

The light receiver 1133 may receive an optical signal (including a control signal). The light receiver 1133 may receive an optical signal corresponding to a user input (e.g., a touch, a press, a touch gesture, a voice, or a motion) from a control apparatus such as a remote controller or a mobile phone.

The input/output unit 1140 may include various input/output circuitry and receive a video (e.g., a dynamic image signal or a still image signal), an audio (e.g., a voice signal or a music signal), and additional information from an external device of the display apparatus 200c under the control of the processor 210.

The input/output unit 1140 may include one of a high-definition multimedia interface (HDMI) port 1141, a component jack 1142, a PC port 1143, and a universal serial bus (USB) port 1144. The input/output unit 1140 may include a combination of the HDMI port 1141, the component jack 1142, the PC port 1143, and the USB port 1144.

The video processor 1150 may include various video processing circuitry and process image data to be displayed on the display 230 and may perform any of various image processing operations such as decoding, rendering, scaling, noise cancelling, frame rate conversion, or resolution conversion on the image data.

In an embodiment of the disclosure, the video processor 1150 may render a chat message received through a server or a chat message input through the user input unit 250 into html.

The display 230 may output, on the screen, content received from a broadcasting station or received from an external server or an external storage medium. The content that is a media signal may include a video signal, an image, or a text signal.

In an embodiment of the disclosure, the display 230 may output video content received from a broadcasting station and a chat room and a chat message received from a server together on one screen.

The audio processor 1160 may include various audio processing circuitry and performs processing on audio data. The audio processor 1160 may perform any of various processing operations such as decoding, amplification, or noise cancelling on the audio data.

The audio output unit 1170 may include various audio output circuitry and output an audio included in content received through the tuner unit 1110, an audio input through the communication unit 240 or the input/output unit 1140, and an audio stored in the memory 220 under the control of the processor 210. The audio output unit 1170 may include at least one of a speaker 1171, a headphone 1172, or a Sony/Philips digital interface (S/PDIF) output terminal 1173.

The user input unit 250 may include various input circuitry and receive a user input for controlling the display apparatus 200c. The user input unit 250 may include various types of user input devices. When a remote controller or a mobile terminal controls the display apparatus 200c, the user input unit 250 may receive a control signal received from the mobile terminal.

Figure 12:
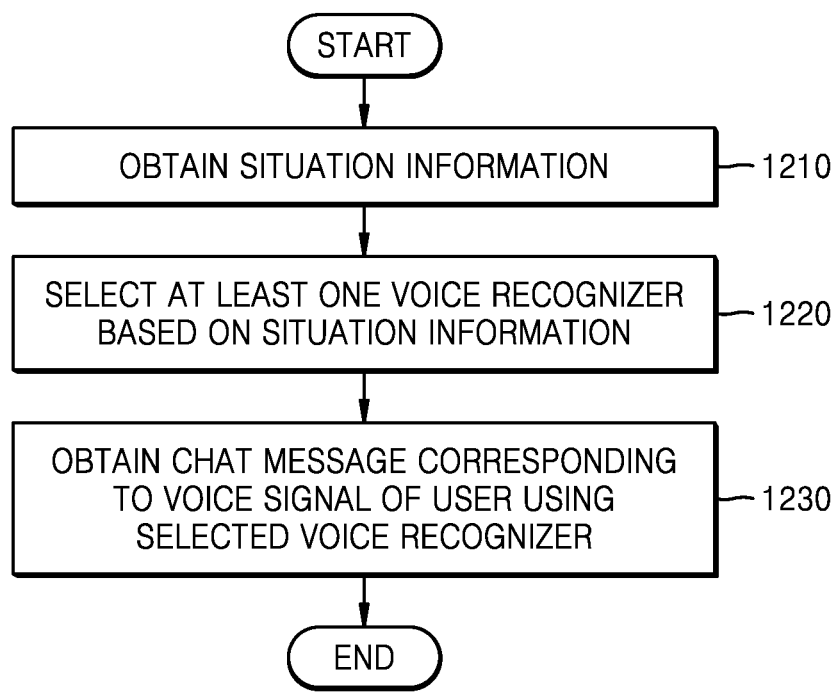
FIG. 12 is a flowchart illustrating an example process of obtaining a chat message from a voice signal, according to various embodiments.

FIG. 12 is a flowchart illustrating an example process of obtaining a chat message from a voice signal, according to various embodiments.

Referring to FIG. 12, a display apparatus may obtain situation information (operation 1210).

The display apparatus may obtain the situation information using information about content output through a display and chat messages of a chat room related to the content.

In an embodiment of the disclosure, the display apparatus may select at least one of a plurality of voice recognizers based on the situation information (operation 1220).

In an embodiment of the disclosure, the display apparatus may obtain a chat message corresponding to a voice signal of a user with the selected voice recognizer (operation 1230).

The display apparatus may obtain a voice recognition result by performing voice recognition with the selected voice recognizer. The display apparatus may obtain the voice recognition result as text.

Figure 13:
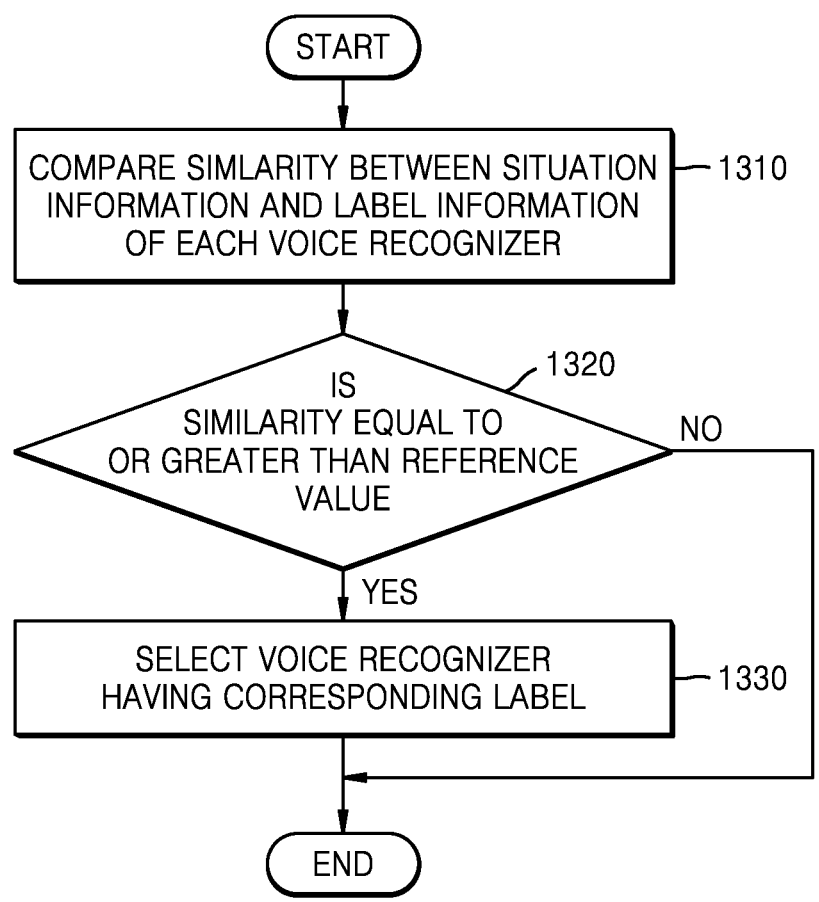
FIG. 13 is a flowchart illustrating an example process of selecting one or more of a plurality of voice recognizers, according to various embodiments.

FIG. 13 is a flowchart illustrating an example process of selecting one or more of a plurality of voice recognizers, according to an embodiment of the disclosure.

A plurality of voice recognizers may be labeled according to a type or a domain of data with which a learning model included in a voice recognizer is trained. The display apparatus may select a voice recognizer to perform voice recognition using situation information and a label of the voice recognizer.

In an embodiment of the disclosure, the display apparatus may compare a similarity between the situation information and label information of the voice recognizer (operation 1310).

In an embodiment of the disclosure, the display apparatus may determine whether the similarity between the situation information and the label information is equal to or greater than a reference value (operation 1320).

In an embodiment of the disclosure, when the similarity between the situation information and the label information is equal to or greater than the reference value (YES in 1320), the display apparatus may select a voice recognizer having a corresponding label (operation 1330).

The display apparatus may obtain one or more voice recognition results by performing voice recognition with the voice recognizer in which the similarity with the situation information is equal to or greater than the reference value.

A method and apparatus for operating a display apparatus according to various embodiments of the disclosure may be implemented as a recording medium including instructions executable by a computer such as a program module. A non-transitory computer-readable medium may be an arbitrary available medium accessible by a computer, and includes all volatile and non-volatile media and separable and non-separable media. Further, examples of the computer-readable medium may include a computer storage medium and a communication medium. The computer storage medium includes all volatile/nonvolatile and separable/non-separable media embodied by a certain method or technology for storing information such as computer-readable instructions, a data structure, a program module, or other data. The communication medium generally includes a computer-readable instructions, a data structure, a program module, other data of a modulated data signal such as a carrier wave, or another transmission mechanism, and an example thereof includes an arbitrary information transmission medium.

A display apparatus and an operating method thereof according to an embodiment of the disclosure may be implemented as a computer program product including a computer-readable recording medium/storage medium having embodied thereon a program for executing an operating method of a display apparatus, the operating method including obtaining situation information for voice recognizer selection, selecting at least one of a plurality of voice recognizers based on the situation information, obtaining a voice recognition result from a user's voice signal using the selected at least one voice recognizer, and obtaining a chat message from the voice recognition result.

A machine-readable storage medium may be provided as a non-transitory storage medium. The 'non-transitory storage medium' denotes a tangible device and may not contain a signal (e.g., electromagnetic waves). This term does not distinguish a case where data is stored in the storage medium semi-permanently and a case where the data is stored in the storage medium temporarily. For example, the 'non-transitory storage medium' may include a buffer where data is temporarily stored.

According to an embodiment of the disclosure, methods according to various embodiments of the disclosure may be provided in a computer program product. The computer program product is a product purchasable between a seller and a purchaser. The computer program product may be distributed in a form of machine-readable storage medium (e.g., a compact disc read-only memory (CD-ROM)), or distributed (e.g., downloaded or uploaded) through an application store or directly or online between two user devices (e.g., smart phones). When distributed online, at least part of the computer program product (e.g., a downloadable application) may be temporarily generated or at least temporarily stored in a machine-readable storage medium, such as a memory of a manufacturer's server, a server of an application store, or a relay server.

While the disclosure has been illustrated and described with reference to various example embodiments thereof, it will be understood by one of ordinary skill in the art that various changes in form and detail may be made without departing from the true spirit and full scope of the disclosure including the following claims and their equivalents. Hence, it will be understood that the embodiments of the disclosure should be considered in descriptive sense only and not for purposes of limitation. For example, each component described as a single type may be implemented in a distributed manner, and similarly, components described as distributed may be implemented in a combined form. It will also be understood that any of the embodiment(s) described herein may be used in conjunction with any other embodiment(s) described herein.

What is claimed is:

1. A display apparatus comprising:
a memory including one or more instructions; and
a processor, comprising processing circuitry, configured to execute the one or more instructions stored in the memory to:
obtain situation information for voice recognizer selection,
select at least one of a plurality of voice recognizers based on the situation information,
obtain a voice recognition result from a voice signal using the selected at least one voice recognizer, and
obtain a chat message from the voice recognition result,
wherein each of the plurality of voice recognizers comprises a learning model configured to be trained with one or more different training data.

2. The display apparatus of claim 1, further comprising a display,
wherein the processor is further configured to execute the one or more instructions to control the display to display content and chat messages of a chat room related to the content,
wherein the situation information comprises at least one of content information about the content or chat information related to chatting.

3. The display apparatus of claim 2, wherein the chat information comprises information about at least one of a title of the chat room or content of the chat messages, and
the content information comprises at least one of subject of the content, a voice signal output together with the content, subtitles, a program name of the content, a content topic, a content type, a content genre, a channel type, a broadcasting station, a producer, a cast, a director, or a content broadcast time.

4. The display apparatus of claim 1,
wherein the different training data comprise at least one of training data by language, training data by field, training data by program type, training data by program genre, training data by broadcasting station, training data by channel, training data by producer, training data by cast, training data by director, training data by region, personalized training data obtained based on user information, or training data obtained based on information about a group to which the user belongs.

5. The display apparatus of claim 4, wherein the user information comprises at least one of user profile information, viewing history information, or chat message content information input by the user, and
the information about the group to which the user belongs comprises at least one of profile information of people whose user information overlaps the user by a reference value or more, viewing history information of the people, or chat message content information input by the people.

6. The display apparatus of claim 1, wherein the plurality of voice recognizers are identified by label information indicating a type of training data used to train the learning model,
wherein the processor is further configured to execute the one or more instructions to select at least one of the plurality of voice recognizers based on a similarity between the situation information and the label information.

7. The display apparatus of claim 1, wherein the processor is further configured to, based on the selected voice recognizers being plural, obtain a plurality of voice recognition results from the voice signal using the selected plurality of voice recognizers.

8. The display apparatus of claim 7, further comprising a display,
wherein the processor is further configured to execute the one or more instructions to:
filter a specified number of or fewer voice recognition results, based on a weight matrix from among the plurality of voice recognition results,
obtain chat messages corresponding to the filtered voice recognition results, and
output the chat messages through the display.

9. The display apparatus of claim 8, wherein the processor is further configured to execute the one or more instructions to:
based on a plurality of chat messages being output through the display, transmit one chat message selected from among the plurality of chat messages to a chat server.

10. The display apparatus of claim 9, wherein the processor is further configured to execute the one or more instructions to update the weight matrix based on the selection.

11. A method performed by a display apparatus comprising a processor comprising processing circuitry, and memory storing instructions, the method for of operating a display apparatus, the method and comprising:
obtaining, by the processing circuitry, situation information for voice recognizer selection;
selecting, by the processing circuitry, at least one of a plurality of voice recognizers based on the situation information;
obtaining, by the processing circuitry, a voice recognition result from a voice signal, using the selected at least one voice recognizer; and
obtaining a chat message from the voice recognition result, wherein each of the plurality of voice recognizers comprises a learning model trained with one or more different training data.

12. The method of claim 11, further comprising displaying content and chat messages of a chat room related to the content,
wherein the situation information comprises at least one of content information about the content or chat information related to chatting.

13. The method of claim 12, wherein the chat information comprises at least one of title information of the chat room or content information of the chat messages, and
the content information comprises at least one of subject of the content, a voice signal output together with the content, subtitles, a program name of the content, a content topic, a content type, a content genre, a channel type, a broadcasting station, a producer, a cast, a director, or a content broadcast time.

14. The method of claim 11,
wherein the different training data comprise at least one of training data by language, training data by field, training data by program type, training data by program genre, training data by broadcasting station, training data by channel, training data by producer, training data by cast, training data by director, training data by region, personalized training data obtained based on user information, or training data obtained based on information about a group to which the user belongs.

15. The method of claim 14, wherein the user information comprises at least one of user profile information, viewing history information of the user, or chat message content information input by the user, and
the information about the group to which the user belongs comprises at least one of profile information of people whose user information overlaps the user by a reference value or more, viewing history information of the people, or chat message content information input by the people.

16. The method of claim 11, wherein the plurality of voice recognizers are identified by label information indicating a type of training data used to train the learning model,
wherein the selecting of the at least one of the plurality of voice recognizers comprises selecting at least one of the plurality of voice recognizers, based on a similarity between the situation information and the label information.

17. The method of claim 11, wherein the obtaining of the voice recognition result comprises,
based on the selected voice recognizers being plural, obtaining a plurality of voice recognition results from the user's voice signal using the plurality of selected voice recognizers.

18. The method of claim 17, wherein the obtaining of the chat message comprises:
filtering a specified number of or fewer voice recognition results based on a weight matrix from among the plurality of voice recognition results; and
obtaining chat messages corresponding to the filtered voice recognition results,
wherein the method further comprises outputting the chat messages.

19. The method of claim 18, further comprising, based on a plurality of chat messages being output, transmitting one chat message selected from among the plurality of chat messages to a chat server.

20. A non-transitory computer-readable recording medium having recorded thereon a program which when executed by a processor of a display apparatus, causes the display to perform operations comprising:
  obtaining situation information for voice recognizer selection;
  selecting at least one of a plurality of voice recognizers based on the situation information;
  obtaining a voice recognition result from a voice signal, using the selected at least one voice recognizer; and
  obtaining a chat message from the voice recognition result,
  wherein each of the plurality of voice recognizers comprises a learning model configured to be trained with one or more different training data.

* * * * *